United States Patent
Watano et al.

(10) Patent No.: US 9,638,953 B2
(45) Date of Patent: May 2, 2017

(54) LIQUID CRYSTAL DISPLAY DEVICE

(71) Applicant: FUJIFILM Corporation, Tokyo (JP)

(72) Inventors: Akiko Watano, Kanagawa (JP); Yukito Saitoh, Kanagawa (JP); Katsufumi Ohmuro, Kanagawa (JP); Mitsuyoshi Ichihashi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/015,664

(22) Filed: Feb. 4, 2016

(65) Prior Publication Data

US 2016/0161801 A1 Jun. 9, 2016

Related U.S. Application Data

(63) Continuation of application No. PCT/JP2014/070589, filed on Aug. 5, 2014.

(30) Foreign Application Priority Data

Aug. 12, 2013 (JP) .................. 2013-167918

(51) Int. Cl.
*G02F 1/1335* (2006.01)
*G02B 5/20* (2006.01)
*G02B 5/30* (2006.01)

(52) U.S. Cl.
CPC ....... *G02F 1/133533* (2013.01); *G02B 5/201* (2013.01); *G02B 5/3083* (2013.01); *G02F 1/133621* (2013.01); *G02F 1/133603* (2013.01); *G02F 2001/133562* (2013.01);

(Continued)

(58) Field of Classification Search
None
See application file for complete search history.

(56) References Cited

U.S. PATENT DOCUMENTS 8,294,168 B2   10/2012   Park et al.
9,110,203 B2    8/2015   Seo et al.
(Continued)

FOREIGN PATENT DOCUMENTS

| JP | 2006-079011 A | 3/2006 |
| JP | 2008-203436 A | 9/2008 |
| JP | 2009-014892 A | 1/2009 |

(Continued)

OTHER PUBLICATIONS

Notification of Reasons for Refusal issued by the Japanese Patent Office on Aug. 2, 2016, in connection with Japanese Patent Application No. 2013-167918.

(Continued)

*Primary Examiner* — Richard Kim
(74) *Attorney, Agent, or Firm* — Jean C. Edwards, Esq.; Edwards Neils LLC

(57) ABSTRACT

Provided is a liquid crystal display device including a viewer-side polarizing plate 1, a liquid crystal cell 11, a backlight-side polarizing plate 21, and a backlight unit 31; in which a three-wavelength (RGB) backlight light source having a narrow half bandwidth of the light emission intensity spectrum is used, and the viewer-side polarizing plate includes, for example, a first absorption material which has a maximum value of absorbance in a wavelength range of 470 nm to 510 nm and has a peak of the absorbance full width at half maximum of which is 50 nm or lower.

6 Claims, 3 Drawing Sheets

(52) U.S. Cl.
CPC ............ *G02F 2001/133567* (2013.01); *G02F 2001/133614* (2013.01); *G02F 2001/133624* (2013.01)

(56) References Cited

U.S. PATENT DOCUMENTS

2011/0309325 A1    12/2011    Park et al.
2012/0206935 A1     8/2012    Seo et al.

FOREIGN PATENT DOCUMENTS

| JP | 2011-007995 A | 1/2011 |
| JP | 2011-258951 A | 12/2011 |
| JP | 2012-169271 A | 9/2012 |
| WO | 2012/043375 A | 4/2012 |

OTHER PUBLICATIONS

International Preliminary Report on Patentability issued by WIPO on Feb. 25, 2016, in connection with International Patent Application No. PCT/JP2014/070589.
International Search Report issued in connection with International Patent Application No. PCT/JP2014/070589 on Oct. 21, 2014.
Written Opinion issued in connection with International Patent Application No. PCT/JP2014/070589 on Oct. 21, 2014.
Jian Chen et al; A High-Efficiency Wide-Color-Gamut Solid-State Backlight System for LCDs Using Quantum Dot Enhancement Film; SID 2012 Digest; Jun. 2012; pp. 895-896; vol. 43, Issue 1; Society for Information Display; U.S.

LIQUID CRYSTAL DISPLAY DEVICE

CROSS-REFERENCE TO RELATED APPLICATIONS

This application is a Continuation of PCT International Application No. PCT/JP2014/070589, filed on Aug. 5, 2014, which was published under PCT Article 21(2) in Japanese, and claims priority under 35 U.S.C. Section 119(a) to Japanese Patent Application No. 2013-167918 filed on Aug. 12, 2013. The above applications are hereby expressly incorporated by reference, in their entirety, into the present application.

BACKGROUND OF THE INVENTION

1. Field of the Invention

The present invention relates to a liquid crystal display device. More specifically, the present invention relates to a liquid crystal display device which has favorable daylight contrast and white luminance and excellent color reproducibility and includes an absorption material.

2. Description of the Related Art

A flat panel display such as a liquid crystal display device (hereinafter, also referred to as LCD) has been used in a broadening range of fields every year as an image display device which has low power consumption and saves spaces. A liquid crystal display device has a constitution in which a backlight (hereinafter, also referred to as BL), a backlight-side polarizing plate, a liquid crystal cell, a viewer-side polarizing plate, and the like are provided in this order.

In the recent flat panel display market, for liquid crystal display devices, development for power saving, high definition, and color reproducibility improvement has been underway in order to improve LCD performance. At the moment, while there is a significant demand for power saving, high definition, and color reproducibility improvement particularly in small-sized display devices such as tablet PCs and smartphones, development of next-generation Hi-visions (4K2K, EBU ratio of 100% or higher) with current TV standards (FHD, 72% of National Television System Committee (NTSC) ratio≈100% of European Broadcasting Union (EBU) ratio) is also underway for large-sized display devices. Therefore, there is an intensifying demand for power saving, high definition, and color reproducibility improvement in liquid crystal display devices.

From the viewpoint of improving color reproducibility, a method for sharpening the light emission spectrum of a backlight has been known. For example, JP2012-169271A describes a method for increasing luminance and improving color reproducibility by realizing white light using a quantum dot (QD) which emits red light and green light as a fluorescent body between a blue LED and a light guide plate. In SID'12 DIGEST p. 895, a method of combining a light conversion sheet (QDEF, also referred to as quantum dot sheet) in which a quantum dot is used in order to improve the color reproducibility of the LCD is proposed.

Meanwhile, an increase in the size of displays or distribution of tablet PCs broadens the operation environment of displays, and improvement of visibility in bright places such as immediately under sunlight or bright indoor lighting has been becoming more important.

Generally, an antireflection function is provided to the display screen of an LCD in order to enable an observer to easily view images. This function can be realized using an anti-reflection film or an anti-glare film. Examples of an ordinary anti-reflection film include an anti-reflection (AR) film or a low reflection (LR) film which is obtained by forming a film having a different refractive index from that of a substrate on the surface of the substrate so as to reduce reflection using an interference effect between light reflected on the surface of the substrate and light reflected on the surface of the formed film. In addition, additional examples of an ordinary anti-glare film include an anti-glare (AG) film which is obtained by forming a film having a fine uneven pattern on the surface of a substrate and includes an anti-glare layer that prevents the mirror-like reflection of images using the scattering effect of light.

However, some of light entering a liquid crystal display device is transmitted through the anti-reflection film or the anti-glare film on the surface and the rest of the light is reflected on the surface of an electrode or the like or the glass surface of a cell in a liquid crystal cell. This is referred to as internal reflection.

Particularly in a case in which a display has a high definition, it is known that glare deteriorates due to interference between pixels of an LCD and the unevenness of an anti-glare layer on the panel surface, and thus suppression of internal reflection becomes more important.

As a method for suppressing internal reflection, a method in which a $\lambda/4$ phase difference plate or a $\lambda/2$ phase difference plate is disposed between a polarizer of a viewer-side polarizing plate and a liquid crystal cell is proposed (refer to WO2012/043375A).

In addition, in JP2008-203436A, use of an optical filter having a maximal absorption in each of a wavelength range of 380 nm to 420 nm, a wavelength range of 480 nm to 520 nm, and a wavelength range of 585 nm to 620 nm in an image display device, particularly, a self-light emission image display device such as a plasma display is proposed in order to suppress degradation of contrast in bright places and improve color reproducibility.

In JP2011-7995A, a method in which, in a projector and a projection screen, a projector light source having a peak at a wavelength different from a plurality of peak wavelengths in a light source spectrum of external light is used, and a color material having an absorption band including a wavelength overlapping with at least one of a plurality of the peak wavelengths of external light is provided in the projection screen is proposed. JP2011-7995A describes that, according to the above-described constitution, it is possible to efficiently absorb external light (that is, unnecessary light) having a light emission peak different from that of the projected light from the projector using the color material, and the light intensity of the external light can be selectively reduced, and thus images with high contrast can be displayed.

SUMMARY OF THE INVENTION

As a result of applying the methods described in the above-described documents to a liquid crystal display device including a three-wave backlight, the present inventors found the following facts. In the method described in WO2010/043375A, it was difficult to suppress a change in the shade during display of a black image while preventing degradation of the surface reflection performance, and particularly, there was a problem in that the contrast (black tightness) in a bright place was poor.

When the optical filter described in JP2008-203436A was used in a liquid crystal display in which a white light-emitting diode (hereinafter, a light-emitting diode will be also referred to as an LED) or a cold cathode fluorescent lamp (hereinafter, also referred to as a CCFL) was used as a light source, light from a backlight was absorbed, and thus there was a problem in that the luminance degraded and power saving could not be realized.

In a case in which an attempt was made to use the means described in JP2011-7995A for suppression of internal reflection in a liquid crystal display, the light emission spectrum of a white LED or a CCFL, which was used in an LCD backlight of the related art, and the light emission spectrum of external light such as sunlight or indoor lighting overlapped with each other in a wide range, and thus it was difficult to selectively absorb and remove only external light.

Luminance improvement leading to power saving and high definition (a decrease in the opening ratio) and color reproducibility improvement (a decrease in the transmittance of a color filter (hereinafter, also referred to as CF)) have a trade-off relationship. Therefore, even in a high-definition LCD as well, it is required to improve color reproducibility, to suppress internal reflection of external light while preventing degradation of luminance during display of a white image so as to improve contrast in a bright place, and to satisfy power saving, a high definition, and color reproducibility improvement.

An object of the present invention is to provide a liquid crystal display device having favorable daylight contrast, white luminance, and color reproducibility.

The present inventors carried out intensive studies in order to achieve the above-described object and consequently found that, when a three-wavelength (RGB) backlight light source having a narrow half bandwidth of the light emission intensity spectrum is used, and, out of the wavelengths of external light, light having a wavelength corresponding to a non-light emission wavelength of the light source is absorbed using an absorption material such as a pigment, capable of absorbing light corresponding to wavelengths in trough portions of the light emission intensity spectrum that is not used at the three wavelengths at the inside of a viewer-side polarizing plate disposed on the viewer side of a liquid crystal cell, that is, particularly, in a path of the external light reaching to the liquid crystal cell including a member in which internal reflection is likely to occur, reduction of external light reflection, a high transmittance, and color reproduction expansion are realized, and it is possible to provide a liquid crystal display device having favorable daylight contrast, white luminance, and color reproducibility.

That is, the above-described object is achieved using the present invention having the following constitutions.

[1] A liquid crystal display device including: a viewer-side polarizing plate; a liquid crystal cell; a backlight-side polarizing plate; and a backlight unit, in which the backlight unit emits blue light which has a light emission central wavelength in a wavelength range of 430 nm to 470 nm and has full width at half maximum of a light emission intensity of 50 nm or lower, green light which has a light emission central wavelength in a wavelength range of 510 nm to 560 nm and has full width at half maximum of a light emission intensity of 50 nm or lower, and red light which has a light emission central wavelength in a wavelength range of 610 nm to 660 nm and has full width at half maximum of a light emission intensity of 50 nm or lower, and the viewer-side polarizing plate includes at least one of a first absorption material which has a maximum value of absorbance in a wavelength range of 470 nm to 510 nm and has a peak of the absorbance full width at half maximum of which is 50 nm or lower, and a second absorption material which has a maximum value of absorbance in a wavelength range of 560 nm to 610 nm and has a peak of the absorbance full width at half maximum of which is 50 nm or lower.

[2] The liquid crystal display device according to [1], in which the viewer-side polarizing plate preferably includes both the first absorption material and the second absorption material.

[3] The liquid crystal display device according to [1] or [2], in which, preferably, the viewer-side polarizing plate includes at least a polarizer and a surface film disposed on a surface of the polarizer on a side opposite to the liquid crystal cell, and at least one of the surface film and the polarizer includes at least one of the first absorption material and the second absorption material.

[4] The liquid crystal display device according to [3], preferably further including at least one of the first absorption material and the second absorption material on the surface film.

[5] The liquid crystal display device according to any one of [1] to [4], in which the backlight unit preferably includes a blue light-emitting diode that emits the blue light and a quantum dot member that emits the green light and the red light when the blue light from the blue light-emitting diode enters.

[6] The liquid crystal display device according to any one of [1] to [4], in which the backlight unit preferably includes a blue light laser that emits the blue light, a green light laser that emits the green light, and a red light laser that emits the red light.

According to the present invention, it is possible to provide a liquid crystal display device having favorable daylight contrast, white luminance, and color reproducibility.

DESCRIPTION OF THE PREFERRED EMBODIMENTS

Figure 1:
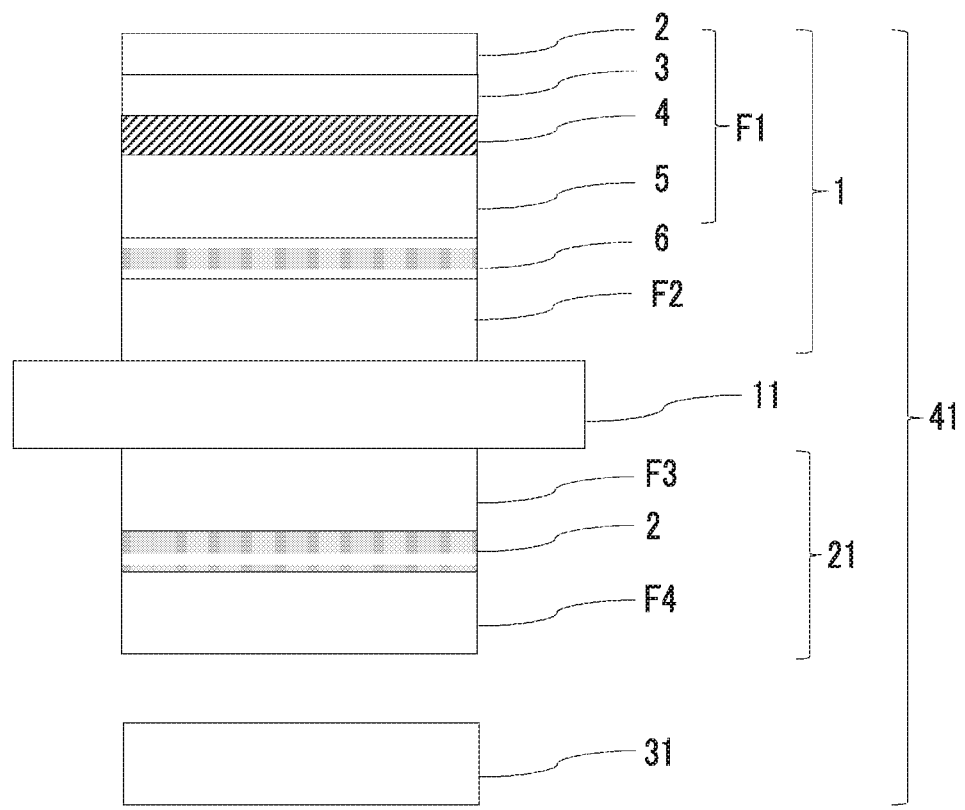
FIG. 1 is a schematic view illustrating a section of an example of a liquid crystal display device of the present invention including a layer including an absorption material on a surface film of a viewer-side polarizing plate.

Hereinafter, a liquid crystal display device of the present invention will be described in detail.

Constitution requirements described below will be, in some cases, described based on a typical embodiment of the present invention, but the present invention is not limited to the above-described embodiment. Meanwhile, in the present specification, numerical ranges expressed using "to" include numerical values before and after the "to" as the lower limit value and the upper limit value.

In the present specification, the "half bandwidth" of a peak refers to the width of the peak at the half of the peak height.

[Liquid Crystal Display Device]

A liquid crystal display device of the present invention includes a viewer-side polarizing plate, a liquid crystal cell, a backlight-side polarizing plate, and a backlight unit, the backlight unit emits blue light which has a light emission central wavelength in a wavelength range of 430 nm to 470 nm and has full width at half maximum (FWHM) of a light emission intensity of 50 nm or lower, green light which has a light emission central wavelength in a wavelength range of 510 nm to 560 nm and has FWHM of a light emission intensity of 50 nm or lower, and red light which has a light emission central wavelength in a wavelength range of 610 nm to 660 nm and has FWHM of a light emission intensity of 50 nm or lower, the viewer-side polarizing plate includes at least one of a first absorption material which has a maximum value of absorbance in a wavelength range of 470 nm to 510 nm and has a peak of the absorbance FWHM of which is 50 nm or lower and a second absorption material which has a maximum value of absorbance in a wavelength range of 560 nm to 610 nm and has a peak of the absorbance FWHM of which is 50 nm or lower.

Due to the above-described constitution, the liquid crystal display device of the present invention is improved in terms of daylight contrast, white luminance, and color reproducibility. When the absorption material that absorbs only unnecessary light other than three wavelengths emitted from the backlight is provided between the surface film and the liquid crystal cell, it is possible to suppress internal reflection of external light at an electrode or the like in the liquid crystal cell which is outside the display outermost surface. According to the present invention, it is possible to reduce internal reflection without sacrificing reflection characteristics in the surface film or decreasing the transmittance of light emitted from the backlight.

In the related art, in JP2008-203436A, an optical filter that absorbs a specific wavelength was used in a self-light emission flat panel display field in which a light source is totally different from that of a liquid crystal display device called a self-light emission flat panel display. In contrast, in a case in which a three-wavelength light source having a central wavelength of the light emission intensity in the three wavelength range like the liquid crystal display device of the present invention is used, light having a wavelength between the three wavelengths becomes unnecessary light included only in external light. Therefore, use of an absorption material that absorbs only unnecessary light barely absorbs light from the backlight and selectively absorbs only external light, and thus it is possible to improve contrast in a bright place without degradation of luminance. In addition, in a case in which a skirt portion of a peak of light emitted from the backlight of the present invention and an absorption peak of the absorption material overlap with each other, the light from the backlight is absorbed to an extent causing no practical problems, and color reproducibility improves. The color reproducibility improvement effect of the absorption material can be equally exhibited not only in a case in which the absorption material is included in the viewer-side polarizing plate but also in a case in which the absorption material is included in any member disposed on the viewer side of the backlight unit such as the liquid crystal cell or the backlight-side polarizing plate.

In addition, in the related art, a light source having a peak different from the light source spectrum of external light, which is described in JP2011-7995A, was used in a projector, and a color material having a peak wavelength of the light source spectrum of external light was put into a projection screen, thereby selectively absorbing the external light. In contrast, in the constitution of the present invention, even when any of ordinary light sources such as sunlight, a CCFL, and a white LED is used, daylight contrast and white luminance become favorable, and thus the absorption efficiency of unnecessary light is high since the wavelength range of unnecessary light included in external light is wide, and use of the absorption material in the viewer-side polarizing plate disposed on the viewer side of the liquid crystal cell causes unnecessary light to pass through the absorption material twice when entering and emitted from the device.

<Overall Constitution and Liquid Crystal Cell>

First, a preferred overall constitution of the liquid crystal display device of the present invention will be described.

An example of the preferred constitution of the liquid crystal display device of the present invention is a transmission-mode liquid crystal panel including a pair of polarizers and a liquid crystal cell between a pair of polarizers. Generally, a retardation film for compensating the view angle is disposed between each of the polarizers and the liquid crystal cell. The constitution of the liquid crystal cell is not particularly limited, and a liquid crystal cell having an ordinary constitution can be employed.

The liquid crystal cell includes, for example, a pair of substrates disposed opposite to each other and a liquid crystal layer sandwiched between a pair of the substrates and may include a color filter layer or the like as necessary. The driving mode of the liquid crystal cell is also not particularly limited, and it is possible to use a variety of modes such as twisted nematic (TN), super twisted nematic (STN), vertical alignment (VA), in-plane switching (IPS), and optically compensated bend cell (OCB).

The liquid crystal cell used in the liquid crystal display device of the present invention is preferably a VA-mode liquid crystal cell, an OCB-mode liquid crystal cell, an IPS-mode liquid crystal cell, or a TN-mode liquid crystal cell, but is not limited thereto.

In the TN-mode liquid crystal cell, when no voltage is applied thereto, rod-like liquid crystal molecules are substantially horizontally aligned and, furthermore, are aligned in a twisted manner at 60° to 120°. The TN-mode liquid crystal cell is most frequently used as a color TFT liquid crystal display device and is described in a number of publications.

In the VA-mode liquid crystal cell, when no voltage is applied thereto, rod-like liquid crystal molecules are substantially vertically aligned. Examples of the VA-mode liquid crystal cell include not only (1) a narrowly-defined VA-mode liquid crystal cell in which rod-like liquid crystal molecules are substantially vertically aligned when no voltage is applied thereto and substantially horizontally aligned when a voltage is applied thereto (described in JP1990-176625A (JP-H02-176625A)) but also (2) a (MVA-mode) liquid crystal cell obtained by forming multi-domains in the VA-mode liquid crystal cell in order to expand the view angle (described on p. 845 in SID97, Digest of tech. Papers (proceedings) 28 (1997)), (3) a liquid crystal cell having a mode in which rod-like liquid crystal molecules are substantially vertically aligned when no voltage is applied thereto and are twisted and multi-domain-aligned when a voltage is applied thereto (n-ASM mode) (described in Proceedings 58 and 59 (1998) of Japanese Liquid Crystal Conference), and (4) a SURVIVAL-mode liquid crystal cell (disclosed in LCD International 98). In addition, the VA-mode liquid crystal cell may be any one of a patterned vertical alignment (PVA)-type liquid crystal cell, an optical alignment-type liquid crystal cell, and a polymer-sustained alignment (PSA) liquid crystal cell. Details of the above-described modes are described in detail in JP2006-215326A and JP2008-538819A.

In the IPS-mode liquid crystal cell, rod-like liquid crystal molecules are aligned substantially parallel to the substrate, and the liquid crystal molecules respond in a planar manner when a planar electric field is applied to the substrate surface. The IPS-mode liquid crystal cell displays black when no electric field is applied thereto, and the absorption axes of a pair of top and bottom polarizing plates are orthogonal to each other. A method for improving a view angle by reducing leakage of light occurring when the liquid crystal cell displays black in a tilt direction using an optical compensation sheet is disclosed in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

The liquid crystal display device of the present invention is preferably constituted by providing a liquid crystal cell including a liquid crystal layer sandwiched between substrates provided with an electrode in at least one of facing sides and disposing the liquid crystal cell between two polarizing plates. The liquid crystal display device includes a liquid crystal cell in which liquid crystals are sealed between top and bottom substrates and displays images by means of a change in the alignment state of the liquid crystals caused by application of a voltage. Furthermore, the liquid crystal display device includes a polarizing plate protective film, an optical compensation member that carries out optical compensation, and accompanying functional layers such as an adhesive layer as necessary. In addition, the liquid crystal display device of the present invention may include other members. For example, surface layers such as a forward scattering layer, a primer layer, an antistatic layer, and an undercoat layer may be disposed together with (or in place of) a color filter substrate, a thin film transistor substrate, a lens film, a diffusion sheet, a hardcoat layer, an anti-reflection layer, a low reflection layer, an anti-glare layer, and the like.

The constitution of the liquid crystal display device of the present invention will be described on the basis of FIGS. 1 to 3. However, the liquid crystal display device of the present invention is not limited by these drawings.

Figure 2:
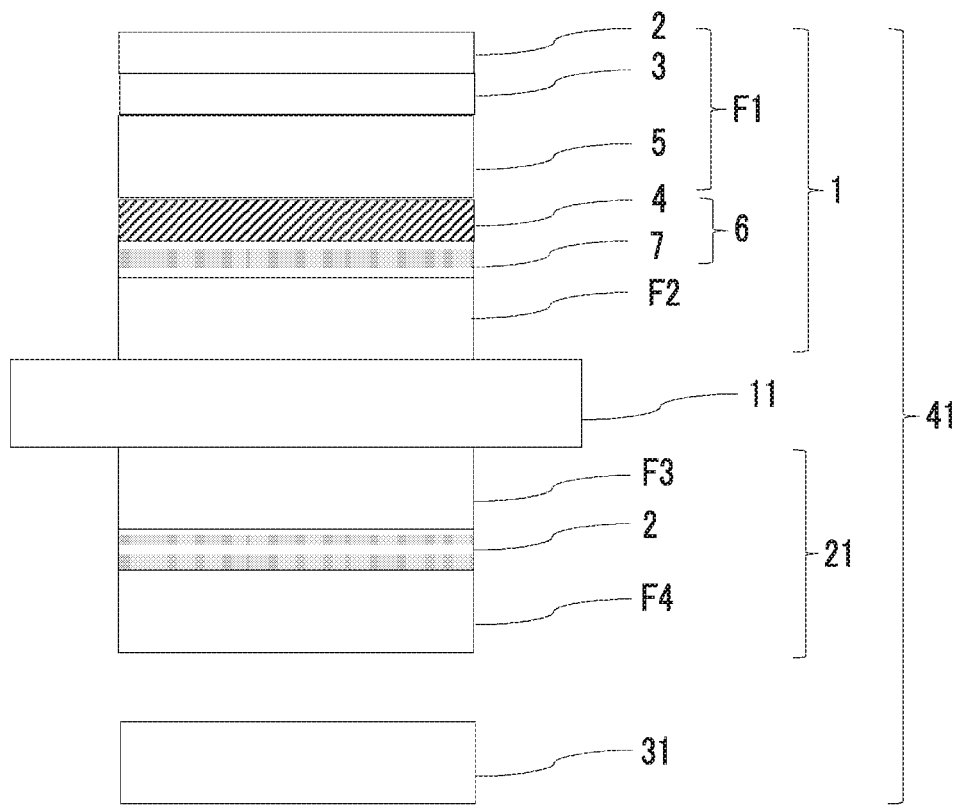
FIG. 2 is a schematic view illustrating a section of an example of the liquid crystal display device of the present invention including the layer including the absorption material on a polarizer of the viewer-side polarizing plate.
Figure 3:
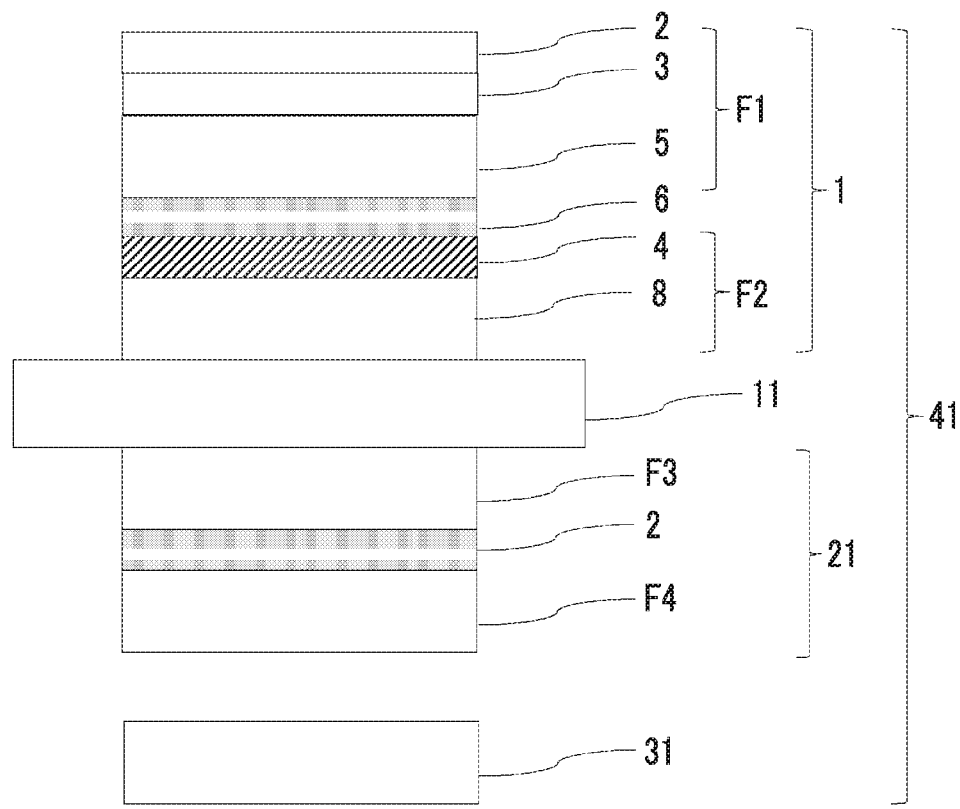
FIG. 3 is a schematic view illustrating a section of an example of the liquid crystal display device of the present invention including the layer including the absorption material on a polarizing plate protective film on an inner side of the viewer-side polarizing plate.

In an aspect of a liquid crystal display device 41 of the present invention illustrated in FIGS. 1 to 3, a viewer-side polarizing plate 1, a liquid crystal cell 11, a backlight-side polarizing plate 21, and a backlight unit 31 are included, and the viewer-side polarizing plate 1 includes at least one of the first absorption material and the second absorption material.

In the liquid crystal display device of the present invention, as illustrated in FIGS. 1 to 3, the viewer-side polarizing plate 1 preferably includes a retardation film F2 on a backlight-side surface of a polarizer 6. The viewer-side polarizing plate 1 preferably includes a retardation film F1 on a viewer-side surface of the polarizer 6.

In FIGS. 1 to 3, the viewer-side polarizing plate 1 has a constitution in which the surface film F1, the polarizer 6, and the retardation film (an inner side polarizing plate protective film of the viewer-side polarizing plate) F2 are provided in this order. Here, in the viewer-side polarizing plate 1, a location including at least one of the first absorption material and the second absorption material is not particularly limited. For example, as illustrated in FIG. 1, the surface film F1 may have a constitution in which a substrate for the surface film 5, a layer 4 including the absorption material including at least one of the first absorption material and the second absorption material, the hardcoat layer 3, and an anti-glare layer 2 are provided in this order. As illustrated in FIG. 2, the polarizer 6 may have a constitution in which a substrate for the polarizer 7 and the layer 4 including the absorption material including at least one of the first absorption material and the second absorption material are provided. As illustrated in FIG. 3, the surface film F2 may have a constitution in which a substrate for the surface film 8 and the layer 4 including the absorption material including at least one of the first absorption material and the second absorption material are provided. In addition, additionally, while not illustrated, examples of the constitution also include a constitution in which the absorption material is provided in the substrate for the surface film or the substrate for the retardation film. Among these, in the liquid crystal display device of the present invention, it is preferable that the viewer-side polarizing plate includes at least a polarizer and a surface film disposed on a surface of the polarizer opposite to the liquid crystal cell, and at least one of the surface film and the polarizer includes at least one of the first absorption material and the second absorption material as illustrated in FIGS. 1 and 2 since internal reflection is suppressed in a larger number of interfaces between members, and thus daylight contrast and white luminance become more favorable. Furthermore, the liquid crystal display device of the present invention preferably includes at least one of the first absorption material and the second absorption material in the surface film since internal reflection is suppressed in a larger number of interfaces between members, and thus daylight contrast and white luminance become more favorable.

The surface film F1 may not include the hardcoat layer 3 or the anti-glare layer 2, but preferably includes the anti-glare layer 2 since reflection of external light in the three wavelength range in which the backlight emits light, that is, reflection of external light having a wavelength which is not absorbed by the first absorption material and the second absorption material is suppressed, and thus daylight contrast and white luminance become more favorable. The surface film 1 preferably includes the hardcoat layer 3 since the surface hardness can be increased.

The retardation film F2 preferably has a phase difference, but the retardation film substantially not having a phase difference is also included in the scope of the present invention and may be a film only having a function of the inner side polarizing plate protective film for the viewer-side polarizing plate substantially not having a phase difference.

In the viewer-side polarizing plate 1, the surface film F1, the polarizer 6, and the retardation film may be laminated together through an adhesive layer not illustrated or may be laminated together in direct contact.

The viewer-side polarizing plate 1 and the liquid crystal cell 11 may be laminated together through an adhesive layer not illustrated or using an adhesive material.

In the liquid crystal display device of the present invention, as illustrated in FIGS. 1 to 3, the backlight-side polarizing plate 21 preferably includes a retardation film F3 on an inner side (also referred to as the liquid crystal cell side, here, the viewer side) surface of a polarizer 22. The backlight-side polarizing plate 21 may include a protective film F4 on the backlight-side surface of the polarizer 22.

In FIGS. 1 to 3, the backlight-side polarizing plate 21 has a constitution in which the retardation film (the inner side polarizing plate protective film of the viewer-side polarizing plate) F3, the polarizer 22, and the polarizing plate protective film (an outer side polarizing plate protective film of the backlight-side polarizing plate) F4 are provided in this order.

The retardation film F3 preferably has a phase difference, but the retardation film substantially not having a phase difference is also included in the scope of the present invention and may be a film only having a function of the outer side polarizing plate protective film for the backlight-side polarizing plate substantially not having a phase difference.

<Viewer-Side Polarizing Plate>

Next, the viewer-side polarizing plate will be described.

The viewer-side polarizing plate in the liquid crystal display device of the present invention includes at least one of a first absorption material which has a maximum value of absorbance in a wavelength range of 470 nm to 510 nm and has a peak of the absorbance FWHM of which is 50 nm or lower and a second absorption material which has a maximum value of absorbance in a wavelength range of 560 nm to 610 nm and has a peak of the absorbance FWHM of which is 50 nm or lower.

The viewer-side polarizing plate in the liquid crystal display device of the present invention, similar to a polarizing plate used in an ordinary liquid crystal display device, preferably includes a polarizer, two polarizing plate protective films disposed on both sides of the polarizer, and a surface film. In the present invention, as the protective film disposed on the liquid crystal cell side out of the two protective films, a retardation film is preferably used.

In the present invention, whether the first absorption material has a maximum value of absorbance in a wavelength range of 470 nm to 510 nm and has a peak of the absorbance FWHM of which is 50 nm or lower is confirmed as described below using the method described in "0047" of JP2008-203436A. In a state in which a layer including the absorption material is formed, the layer including the absorption material is peeled off from other members, and the absorbance of the film is measured using an UV3150 (Shimadzu Corporation). The presence of a peak having the maximum value of absorbance in a wavelength range of 470 nm to 510 nm is checked from the spectrum of the measured absorbance. In addition, the difference between two wavelengths at which the absorbance is half the maximum value of the absorbance is considered as the half bandwidth.

Meanwhile, whether the second absorption material has a maximum value of absorbance in a wavelength range of 560 nm to 610 nm and has a peak of the absorbance FWHM of which is 50 nm or lower is also confirmed using the same method as that for the first absorption material.

(Layer Including Absorption Material)

In the liquid crystal display device of the present invention, the viewer-side polarizing plate includes at least one of the first absorption material and the second absorption material and preferably includes both the first absorption material and the second absorption material.

As described in the description of the overall constitution of the liquid crystal display device, a location including at least one of the first absorption material and the second absorption material is not particularly limited, the first absorption material and the second absorption material may be added to a substrate constituting each of the members such as the surface film, the polarizer, or the retardation film or the functional layers, or a "layer including the absorption material" including at least one of the first absorption material and the second absorption material may be separately provided in addition to the substrate constituting each of the members such as the surface film, the polarizer, or the retardation film or the functional layers.

The number of the layers including the absorption material may be one or more. One of layers constituting the layer including the absorption material may be the layer including the first absorption material and the second absorption material, or each of a plurality of layers constituting the layer including the absorption material may include one first absorption material and one second absorption material.

The first absorption material and the second absorption material are dyes or pigments and preferably dyes.

—Dye—

As the first absorption material (a dye or a pigment) which has a maximum value of absorbance (hereinafter, also referred to as the maximal absorption) in a wavelength range of 470 nm to 510 nm and has a peak of the absorbance FWHM of which is 50 nm or lower, a squarylium-based compound, an axomethine-based compound, a cyanine-based compound, an oxonol-based compound, an anthraquinone-based compound, an azo-based compound, or a benzylidene-based compound is preferably used. As an azo dye, a number of azo dyes described in GB539703A, GB575691A, U.S. Pat. No. 2,956,879A, Hiroshi Horiguchi, "Review Synthetic dyes", Sankyo Publishing Co., Ltd., and the like can be used. Examples of the first absorption material which has the maximal absorption in a wavelength range of 470 nm to 510 nm and has a peak of the absorbance FWHM of which is 50 nm or lower will be illustrated below.

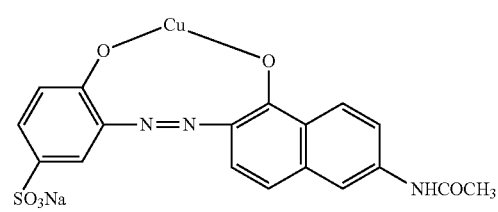

(a1)

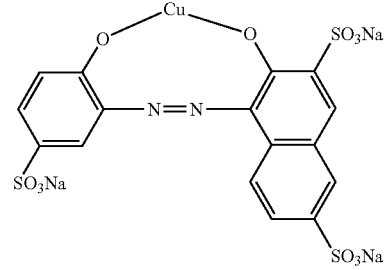

(a2)

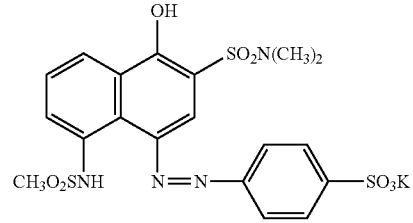

(a3)

(a4)
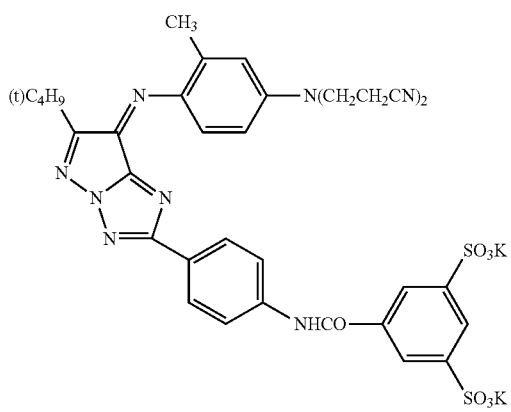

(a5)
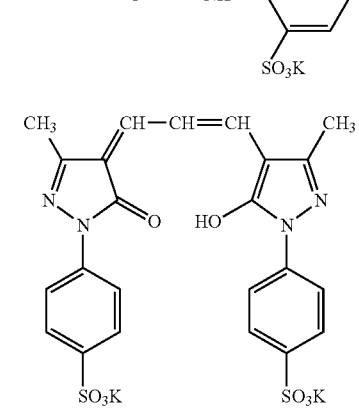

(a6)
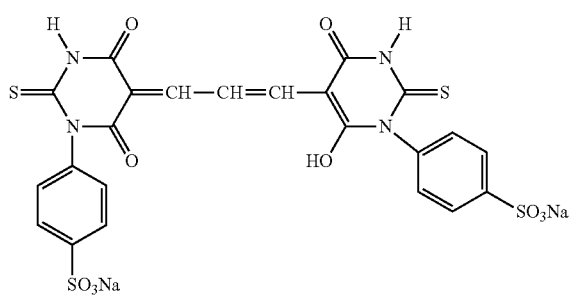

(a7)
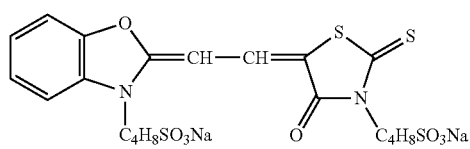

(a8)
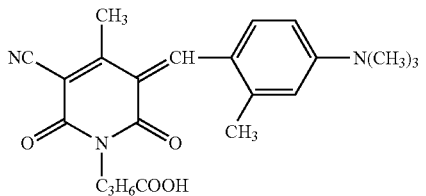

(a9)
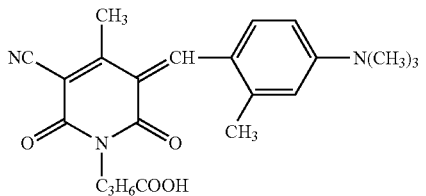

(a10)
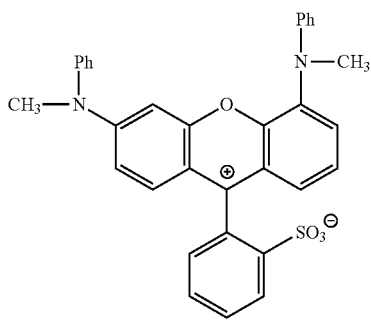

(a11)
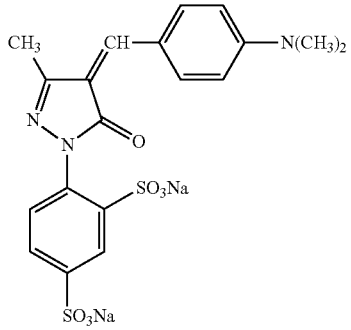

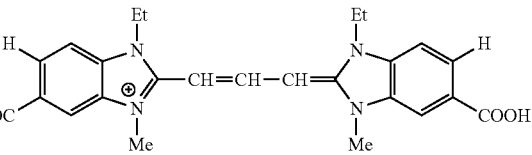

As the second absorption material (a dye or a pigment) which has a maximum value of absorbance in a wavelength range of 560 nm to 610 nm and has a peak of the absorbance FWHM of which is 50 nm or lower, a cyanine-based compound, a squarylium-based compound, an azomethine-based compound, a xanthene-based compound, an oxonol-based compound, or an azo-based compound is preferred, and a cyanine-based pigment or an oxonol-based pigment is more preferably used. Examples of the second absorption material which has the maximal absorption in a wavelength range of 560 nm to 610 nm and has a peak of the absorbance FWHM of which is 50 nm or lower will be illustrated below.

(b1)
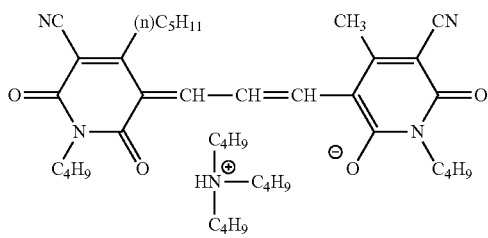

-continued

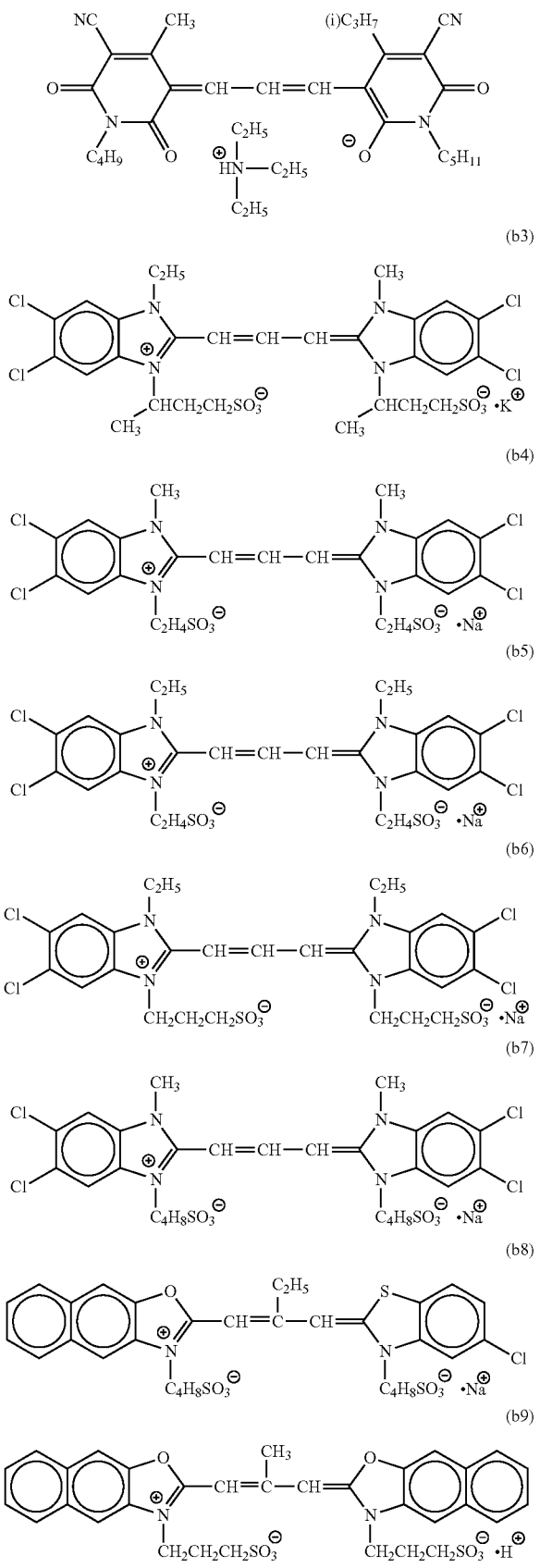

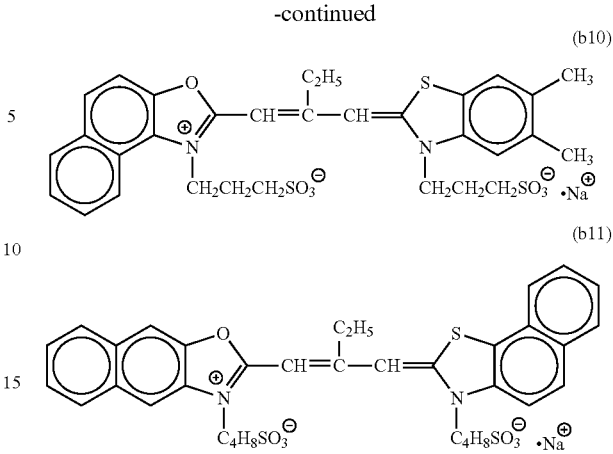

Regarding the synthesis of the cyanine dye, descriptions in the respective specifications of JP1995-230671A (JP-H07-230671A), EP0778493B, and U.S. Pat. No. 5,459,265A can be referred to. Regarding the synthesis of the azo dye, descriptions in the respective specifications of GB539703A, GB575691A, U.S. Pat. No. 2,956,879B, and Hiroshi Horiguchi, Review Synthetic dyes (Sankyo Publishing Co., Ltd., published in 1968) can be referred to. Regarding the synthesis of the azomethine dye, descriptions of JP1987-3250A (JP-S62-3250A), JP1992-178646A (JP-H04-178646A), and JP1993-323501A (JP-H05-323501A) can be referred to. Regarding the synthesis of the oxonol dye, descriptions in the respective specifications of JP1995-230671A (JP-H07-230671A), EP0778493B, and U.S. Pat. No. 5,459,265A can be referred to. Regarding the synthesis of a merocyanine dye, descriptions of U.S. Pat. No. 2,170,806A, JP1980-155350A (JP-S55-155350A), and JP1980-161232A (JP-S55-161232A) can be referred to. Regarding the synthesis of the anthraquinone dye, descriptions in the respective specifications of GB710060A, U.S. Pat. No. 3,575,704A, JP1973-5425A (JP-S48-5425A), and Hiroshi Horiguchi, Review Synthetic dyes (Sankyo Publishing Co., Ltd., published in 1968) can be referred to. Other dyes can also be synthesized with reference to descriptions of F. M. Harmer "Heterocyclic Compounds-Cyanine Dyes and Related Compounds", John Wiley and Sons, New York, London, 1964; D. M. Sturmer, "Heterocyclic Compounds-Special topics in Heterocyclic Chemistry" Chapter 18, Section 14, pp. 482 to 515, John Wiley and Sons, New York, London, 1977; "Rodd' Chemistry of Carbon Compounds" Issue. 2, Volume 4, Part B, Chapter 15, pp. 369 to 422, Elsevier Science Publishing Company Inc., New York, 1977; JP1993-88293A (JP-H05-88293A), and JP1994-313939A (JP-H06-313939A).

As the dye, it is possible to use a combination of two or more pigments described above. In addition, it is also possible to use a pigment having the maximal absorption in two or more ranges of a wavelength range of 380 nm to 420 nm, a wavelength range of 470 nm to 510 nm, and a wavelength range of 560 nm to 610 nm. For example, when the pigment is put into an associate state as described below, generally, the wavelength is shifted to the long wavelength side, and the peak becomes sharper. Therefore, the pigment having the maximal absorption in a wavelength range of 470 nm to 510 nm may also be an associate having the maximal absorption in a wavelength range of 560 nm to 610 nm. When the above-described pigment is used in a state of partially forming an associate, it is possible to obtain the maximal absorption both in a wavelength range of 470 nm to 510 nm and in a wavelength range of 560 nm to 610 nm. Examples of the above-described pigment will be illustrated below. Meanwhile, examples of an additional compound having the maximal absorption in a wavelength range of 380 nm to 420 nm include the compounds described in "0016" and "0017" of JP2008-203436A.

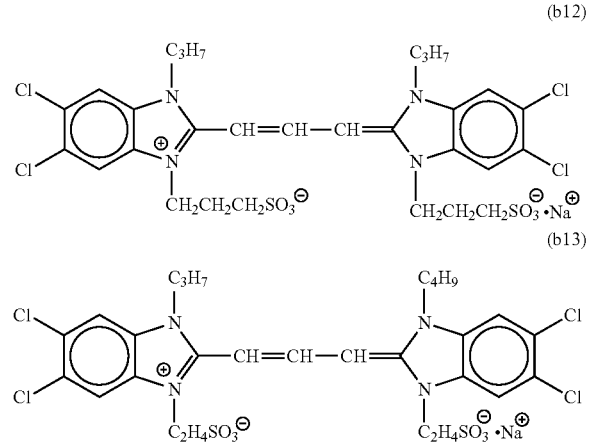

Examples of an additional first absorption material and an additional second absorption material include the pigment compounds described in JP2000-321419A, JP2002-122729A, and JP4504496B, and the contents thereof are incorporated into the present invention.

The wavelength range in which the maximal absorption of the first absorption material having the maximal absorption in a wavelength range of 470 nm to 510 nm appears is preferably in a range of 475 nm to 510 nm and more preferably in a range of 480 nm to 505 nm.

The wavelength range in which the maximal absorption of the second absorption material having the maximal absorption in a wavelength range of 560 nm to 610 nm appears is preferably in a range of 570 nm to 605 nm and more preferably in a range of 580 nm to 600 nm.

The content of the dye in the layer including the absorption material is preferably in a range of 0.001% by mass to 0.05% by mass and more preferably in a range of 0.001% by mass to 0.01% by mass of the total mass of the layer including the absorption material.

—Half Bandwidth—

The absorption spectra of the first absorption material having the maximal absorption in a wavelength range of 470 nm to 510 nm and the second absorption material having the maximal absorption in a wavelength range of 560 nm to 610 nm are sharp in order to selectively cut light so as to prevent influences on the blue light, the green light, and the red light. Specifically, the half bandwidth (the width of a wavelength range in which half of the absorbance at the maximal absorption appears) in the absorption spectrum of the first absorption material having the maximal absorption in a wavelength range of 470 nm to 510 nm is 50 nm or smaller, preferably in a range of 5 nm to 40 nm, and more preferably in a range of 10 nm to 30 nm. The half bandwidth in the absorption spectrum of the second absorption material having the maximal absorption in a wavelength range of 560 nm to 610 nm is 50 nm or smaller, preferably in a range of 5 nm to 40 nm, and more preferably in a range of 10 nm to 30 nm.

Examples of means for setting the half bandwidth in the above-described range include addition of a plurality of dyes or pigments having different maximal absorptions in a wavelength range to the layer including the absorption material, addition of an associate of the dye to the layer including the absorption material, and the like.

Specifically, as the dye, a methane dye (for example, cyanine, merocyanine, oxonol, pyrromethene, styryl, or arylidene), a diphenylmethane dye, a triphenylmethane dye, a xanthene dye, a squarylium dye, a croconium dye, an azine dye, an acridine dye, an thiazine dye, an oxazine dye, or the like can be selected. These dyes are preferably used in an associate form.

The dye in an associate state forms a so-called J band and thus exhibits a sharp absorption spectrum peak. Regarding the association of dyes and the J band, there are descriptions in a variety of publications (for example, Photographic Science and engineering Vol. 18, No. 323 to 335 (1974)). The maximal absorption of a dye in a J association state migrates to the longer wavelength side than the maximal absorption of a dye in a solution state. Therefore, whether the dye in the layer including the absorption material is in an association state or in a non-association state can be easily determined by measuring the maximal absorption. In a dye in an association state, the migration of the maximal absorption is preferably 30 nm or more, more preferably 40 nm or more, and most preferably 45 nm or more.

The dye used in an association state is preferably a methane dye and most preferably a cyanine dye or an oxonol dye. Examples of the above-described dye include compounds that form an associate simply by being dissolved in water; however, generally, an associate can be formed by adding gelatin or a salt (for example, barium chloride, calcium chloride, or sodium chloride) in an aqueous solution of the dye. A method for forming an associate is particularly preferably a method in which gelatin is added to an aqueous solution of the dye. A specimen including a plurality of associates having different maximal absorptions can be produced by respectively dispersing a plurality of dyes having different maximal absorptions in an aqueous solution including gelatin and then mixing the components. Alternatively, depending on the dye, individual associates can be formed simply by dispersing a plurality of dyes in an aqueous solution including gelatin. An associate of the dye can also be formed in a form of a fine solid particle dispersion substance of the dye. In order to produce the fine solid particle dispersion substance, a well-known disperser can be used. Examples of the disperser include a ball mill, a vibration ball mill, a planetary ball mill, a sand mill, a colloid mill, a jet mill, and a roller mill. Regarding the disperser, there are descriptions in JP1977-92716A (JP-S52-92716A) and WO88/074794A. A vertical or horizontal medium disperser is preferred.

—Additives—

Additionally, to the layer including the absorption material, additives such as an infrared absorber or an ultraviolet absorber may be added, and the additives described in "0031" of JP2008-203436A can be used.

—Binder—

The layer including the absorption material preferably includes a polymer binder in order to control the stability and reflection characteristics of the first absorption material and the second absorption material. As the polymer binder, a binder well known to a person skilled in the art can be used, but a water-based binder is preferably used in order to easily operate dispersion. Examples of the water-based binder include gelatin, polyvinyl alcohols, polyacrylamides, polyethylene glycols, and the like. Particularly, in order to form the layer including the absorption material while maintaining the formed associate, gelatin which is generally known to have excellent protective colloid properties with respect to dispersed particles is preferably used.

The gelatin is not particularly limited, and gelatin having a mass-average molecular weight of 100,000 or higher which is extracted and purified by means of an ordinary acid treatment or alkali treatment may be used. An aqueous solution including approximately 10% by mass of the above-described gelatin generally loses fluidity as liquid at 25° C. and gels. In order to put an aqueous solution of gelatin into a coatable state, it is necessary to decrease the temperature of a coating fluid or decrease the concentration of gelatin in the coating fluid; however, in both cases, there is a tendency that the associate of the dye becomes unstable. Therefore, in gelatin used as the binder, the viscosity of a 10% by mass aqueous solution at 25° C. is preferably in a range of 5 mPa·s to 100 mPa·s and more preferably in a range of 5 mPa·s to 50 mPa·s. When the viscosity is lower than 5 mPa·s, wind unevenness is likely to be caused in a drying process, and when the viscosity exceeds 100 mPa·s, conversely, it is difficult to level the binder until the binder is fully dried after being applied, and a surface state problem is likely to be caused. Gelatin may be singly used, or a mixture of two or more gelatins may be used as long as the viscosity thereof is within the above-described range. The viscosity is measured using a B-type viscometer manufactured by Tokyo Keiki Inc. under conditions of a No. 1 rotor and 60 rpm.

The mass-average molecular weight of the gelatin used as the binder is preferably in a range of 2,000 to 50,000 and more preferably in a range of 2,000 to 20,000. The average molecular weight is measured according to a molecular weight distribution measurement method by means of a gel filtration method described in a PAGI method (test method for gelatin for photo film).

Specific examples of the gelatin include #860, #880, and #881 (all manufactured by Nitta Gelatin Inc.). These gelatins may be singly used, or a mixture of two or more gelatins may be used as necessary.

The content of the binder in the layer including the absorption material is preferably in a range of 95% by mass to 99% by mass and more preferably in a range of 97% by mass to 99% by mass of the total mass of the layer including the absorption material.

—Undercoat Layer—

When the layer including the absorption material is provided on a support such as an arbitrary substrate, it is possible to provide an undercoat layer on the support. The undercoat layer is preferably a flexible polymer having a modulus of elasticity at room temperature in a range of 1,000 MPa to 1 MPa, preferably in a range of 800 MPa to 5 MPa, and more preferably in a range of 500 MPa to 10 MPa. In addition, the thickness thereof is preferably in a range of 2 nm to 20 μm, more preferably in a range of 5 nm to 5 μm, and most preferably in a range of 50 nm to 1 μm. A polymer used for the undercoat layer preferably has a glass transition temperature in a range of −60° C. to 60° C. Examples of the polymer having a glass transition temperature in a range of −60° C. to 60° C. include polymers and copolymers of vinyl chloride, vinylidene chloride, vinyl acetate, butadiene, neoprene, styrene, chloroprene, acrylic acid ester, methacrylic acid ester, acrylonitrile, or methylene vinyl ether. In addition, it is possible to provide a plurality of the undercoat layers, and two layers are preferably provided.

—Method for Forming Layer Including Absorption Material—

The layer including the absorption material can be obtained by applying a coating fluid including the dye, the binder, and other components onto a support directly or through the undercoat layer and drying the coating fluid. A solvent for the coating fluid is not particularly limited, but water or an aqueous solution including a salt such as barium chloride, potassium chloride, sodium chloride, or calcium chloride is preferred. In addition, the solvent preferably does not substantially include an alcohol (the concentration of the alcohol is 3% by mass or lower).

As a coating method for forming the layer including the absorption material including the dye, the undercoat layer, and other layers, an ordinary coating method may be used. Examples of the coating method include a dip coating method, an air knife coating method, a curtain coating method, a roller coating method, a wire bar coating method, a gravure coating method, and an extrusion method in which a hopper is used (described in the specification of U.S. Pat. No. 2,681,294A). Two or more layers may be formed at the same time by means of coating. Regarding a simultaneous coating method, there are descriptions in the respective specifications of U.S. Pat. No. 2,761,791A, U.S. Pat. No. 2,941,898A, U.S. Pat. No. 3,508,947A, and U.S. Pat. No. 3,526,528A, and Yuji Harazaki "Coating Engineering" p. 253 (published by Asakura Publishing Co., Ltd. in 1973). In addition, as a method for forming layers in the present invention, a sputtering method, a vacuum deposition method, an ion plating method, a plasma CVD method, or a PVD method can also be appropriately selected.

The thickness of the layer including the absorption material is preferably in a range of 0.1 μm to 100 μm and still more preferably in a range of 0.5 μm to 30 μm.

(Polarizer)

As the polarizer, a polarizer obtained by adsorbing and aligning iodine in a polymer film is preferably used. The polymer film is not particularly limited, and a variety of polymer films can be used. Examples thereof include hydrophilic macromolecular films such as a polyvinyl alcohol-based film, a polyethylene terephthalate-based film, an ethylene/vinyl acetate copolymer-based film, films obtained by partially saponifying the above-described film, hydrophilic macromolecular films such as a cellulose-based film, polyene-based alignment films such as a dehydrated substance of a polyvinyl alcohol and a dechlorinated substance of a polyvinyl chloride, and the like. Among these, a polyvinyl alcohol-based film having an excellent dyeing affinity due to iodine as a polarizer is preferably used.

As a material for the polyvinyl alcohol-based film, a polyvinyl alcohol or a derivative thereof is used. Examples of the derivative of a polyvinyl alcohol include polyvinyl formal, polyvinyl acetal, and furthermore, polyvinyl formal and polyvinyl acetal which are denatured using an olefin such as ethylene or propylene, a unsaturated carboxylic acid such as acrylic acid, methacrylic acid, or crotonic acid, an alkyl ester or acrylamide thereof, or the like.

The degree of polymerization of the polymer which is a material for the polymer film is generally in a range of 500 to 10,000, preferably in a range of 1,000 to 6,000, and more preferably in a range of 1,400 to 4,000. Furthermore, in the case of a saponified film, the degree of saponification is, for example, preferably 75% by mol or higher, more preferably 98% by mol or higher, and still more preferably in a range of 98.3% by mol to 99.8% by mol in terms of solubility in water.

The polymer film (un-stretched film) is subjected to at least a uniaxial stretching treatment and an iodine dyeing treatment according to an ordinary method. Furthermore, it is possible to carry out a boric acid treatment and a cleansing treatment on the polymer film. In addition, the polymer film that has been subjected to the above-described treatments (stretched film) is dried according to an ordinary method, thereby turning into a polarizer.

A stretching method in the uniaxial stretching treatment is not particularly limited, and any of a wet stretching method and a dry stretching method can be employed. Examples of stretching means for the dry stretching method include an inter-roll stretching method, a heating roll stretching method, a compression stretching method, and the like. The polymer film can be stretched in multiple stages. In the stretching means, the un-stretched film is generally turned into a heated state. The stretching ratio of the stretched film can be appropriately set according to the purpose, and the stretching ratio (total stretching ratio) is set in a range of approximately 2 times to 8 times, preferably set in a range of 3 times to 7 times, and more preferably set in a range of 3.5 times to 6.5 times.

The iodine dyeing treatment is carried out by, for example, immersing the polymer film in an iodine solution including iodine and potassium iodide. The iodine solution is generally an aqueous solution of iodine and includes iodine and potassium iodide as a solution aid. The concentration of iodine is in a range of approximately 0.01% by mass to 1% by mass and preferably in a range of 0.02% by mass to 0.5% by mass. The concentration of potassium iodide is in a range of approximately 0.01% by mass to 10% by mass and, furthermore, preferably in a range of 0.02% by mass to 8% by mass.

In the iodine dyeing treatment, the temperature of the iodine solution is generally in a range of approximately 20° C. to 50° C. and preferably generally in a range of 25° C. to 40° C. The immersion duration is generally in a range of approximately 10 seconds to 300 seconds and preferably in a range of 20 seconds to 240 seconds. In the iodine dyeing treatment, the content of iodine and the content of potassium in the polymer film are adjusted to fall into the above-described ranges by adjusting the conditions such as the concentration of the iodine solution and the immersion temperature and immersion duration of the polymer film in the iodine solution to be desired values. The iodine dyeing treatment may be carried out in any stage of before the uniaxial stretching treatment, during the uniaxial stretching treatment, and after the uniaxial stretching treatment.

When optical characteristics are taken into account, the content of iodine in the polarizer is, for example, in a range of 2% by mass to 5% by mass and preferably in a range of 2% by mass to 4% by mass.

The polarizer preferably includes potassium. The content of potassium is preferably in a range of 0.2% by mass to 0.9% by mass and more preferably in a range of 0.5% by mass to 0.8% by mass. When the polarizer includes potassium, the polarizer has a preferred complex modulus of elasticity (Er), and a polarizing film having a high degree of polarization can be obtained. Potassium can be added to the polarizer by, for example, immersing the polymer film, which is a material for forming the polarizer, in a solution including potassium. This solution may also serve as the solution including iodine.

As the drying treatment step, a well-known drying method in the related art such as natural drying, blowing drying, or heating drying can be used. For example, in heating drying, the heating temperature is in a range of approximately 20° C. to 80° C., and the drying duration is in a range of approximately 1 minute to 10 minutes. In addition, the polymer film can be appropriate stretched in the drying treatment step as well.

The thickness of the polarizer is not particularly limited, but is generally in a range of 5 μm to 300 μm, preferably in a range of 10 μm to 200 μm, and more preferably in a range of 20 μm to 100 μm.

Regarding the optical characteristics of the polarizer, when measured using a polarizer single body, the single body transmittance is preferably 43% or higher and more preferably in a range of 43.3% to 45.0%. In addition, the orthogonal transmittance, which is measured by preparing two polarizers and superimposing the polarizers so that the absorption axes of the two polarizers form 90°, is preferably smaller, practically, preferably in a range of 0.00% to 0.050%, and more preferably 0.030% or smaller. The degree of polarization is, practically, preferably in a range of 99.90% to 100% and particularly preferably in a range of 99.93% to 100%. The polarizer is preferably capable of producing almost the same optical characteristics as what have been described above even when the optical characteristics are measured as the polarizing plate as well.

(Surface Film)

The viewer-side polarizing plate preferably includes the surface F1 on the viewer-side surface of the polarizer as the outer side polarizing plate protective film of the viewer-side polarizing plate.

The surface film F1 may be a single-layer film made of only a substrate, but is preferably a laminate film including a functional layer such as a hardcoat layer or an anti-glare layer on a substrate and preferably a laminate film including a hardcoat layer and an anti-glare layer on a substrate from the viewpoint of suppressing the reflection of external light.

The viewer-side polarizing plate may include a polarizing plate protective film on a side of the polarizer opposite to the liquid crystal cell and may not include any polarizing plate protective films.

—Substrate—

As a substrate for the surface film F1, a thermoplastic resin having excellent transparency, mechanical strength, heat stability, moisture-shielding properties, isotropy, and the like is used. Specific examples of the thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (norbornene-based resin), a polyarylate resin, a polystyrene resin, a polyvinyl alcohol resin, and mixtures thereof. Among these, the substrate for the surface film F1 is preferably a cyclic polyolefin-based resin, a cellulose resin, or a polyester resin, more preferably a cyclic polyester-based resin, a cellulose acylate resin, or a polyethylene terephthalate, and particularly preferably a cellulose acylate resin.

The cellulose resin is an ester of cellulose and an aliphatic acid. Specific examples of the cellulose ester-based resin include triacetyl cellulose, diacetyl cellulose, tripropyl cellulose, dipropyl cellulose, and the like. Among these, triacetyl cellulose is particularly preferred. A number of products of triacetyl cellulose are commercially available, and thus triacetyl cellulose is advantageous in terms of ease of procurement and costs as well. Examples of the commercially available product of triacetyl cellulose include "UV-50", "UV-80", "SH-80", "TD-80U", "TD-TAC", "UZ- TAC", and "TD60UL" trade names manufactured by Fujifilm Corporation, "KC series" manufactured by Konica Corporation, and the like.

The cyclic polyolefin resin is, specifically, preferably a norbornene-based resin. A cyclic olefin-based resin is a collective term for resins polymerized using a cyclic olefin as a polymerization unit, and examples thereof include the resins described in JP1989-240517A (JP-H01-240517A), JP1991-14882A (JP-H03-14882A), JP1991-122137A (JP-H03-122137A), and the like. Specific examples thereof include open-ring (co)polymers of cyclic olefins, addition polymers of cyclic olefins, copolymers of a cyclic olefin and an α-olefin such as ethylene or propylene (typically, a random copolymer), graft polymers obtained by denaturing the above-described resin using unsaturated carboxylic acid or a derivative thereof, hydrogenated substances thereof, and the like. Specific examples of the cyclic olefin include norbornene-based monomers.

As the cyclic polyolefin resin, a variety of products are commercially available. Specific examples thereof include "ZEONEX", "ZEONOA" trade names manufactured by ZEON Corporation, "ARTON" trade name manufactured by JSR Corporation, "TOPAS" trade name manufactured by TICONA Corporation, and "APEL" trade name manufactured by Mitsui Chemicals, Inc.

As the (meth)acrylic resin, an arbitrary appropriate (meth)acrylic resin can be employed as long as the effects of the present invention are not impaired. Examples thereof include poly(meth)acrylic acid esters such as methyl polymethacrylate, methyl methacrylate-(meth)acrylic acid copolymers, methyl methacrylate-(meth)acrylic acid ester copolymers, methyl methacrylate-acrylic acid ester-(meth)acrylic acid copolymer, methyl(meth)acrylate-styrene copolymers (MS resins and the like), and polymers having an alicyclic hydrocarbon group (for example, methyl methacrylate-cyclohexyl methacrylate copolymer, methyl methacrylate-(meth)acrylic acid norbornyl copolymer, and the like). Preferred examples thereof include C1-6 alkyl poly(meth)acrylate such as methyl poly(meth)acrylate, and more preferred examples thereof include methyl methacrylate-based resins including methyl methacrylate as a main component (50% by mass to 100% by mass and preferably 70% by mass to 100% by mass).

Specific examples of the (meth)acrylic resin include ACRYPET VH and ACRYPET VRL20A manufactured by Mitsubishi Rayon Co., Ltd., the (meth)acrylic resin having a ring structure in the molecule described in JP2004-70296A, and the (meth)acrylic resin having a high Tg which is obtained through intramolecular crosslinking or an intramolecular cyclization reaction.

As the (meth)acrylic resin, it is also possible to use a (meth)acrylic resin having a lactone ring structure. This is because the (meth)acrylic resin has high heat resistance, high transparency, and high mechanical strength when being biaxial-stretched.

The thickness of the protective film can be appropriately set and is generally in a range of approximately 1 µm to 500 µm in terms of strength, operability such as handling, and thin layer properties. Particularly, the thickness thereof is preferably in a range of 1 µm to 300 µm and more preferably in a range of 5 µm to 200 µm. The thickness of the protective film is particularly suitably in a range of 5 µm to 150 µm.

Meanwhile, in the present specification, "visible light" refers to light having a wavelength in a range of 380 nm to 780 nm. In addition, in the present specification, the measurement wavelength is 550 nm unless particularly specified.

In addition, in the present specification, angles (for example, angles such as "90°") and relationships therebetween (for example, "orthogonal", "parallel", "crossing at 45°", and the like) do not necessarily need to be exact as long as the margin of error is within an acceptable range in the technical field to which the present invention belongs. For example, a specific angle means an angle in a range of the specific angle±smaller than 10°, and the margin of error from the specific angle is preferably 5° or lower and more preferably 3° or lower.

In the present specification, the "slow axis" in the retardation film or the like refers to a direction in which the refractive index becomes greatest.

In addition, in the present specification, numeric values, numeric ranges, and qualitative expressions (for example, expressions such as "identical" and "equivalent") indicating the optical characteristics of the respective members such as a phase difference region, the retardation film, and the liquid crystal layer are interpreted to include numeric values, numeric ranges, and properties having a margin of error within a range generally acceptable in the liquid crystal display device and the members used therein.

In addition, in the present specification, "front surface" refers to the normal direction to the display surface, "front surface contrast (CR)" refers to the contrast computed from white luminance and black luminance measured in the normal direction to the display surface, and "view angle contrast (CR)" refers to the contrast computed from white luminance and black luminance measured in a tilt direction tilted from the normal direction to the display surface (for example, a direction defined as 60 degrees in the polar angle direction with respect to the display surface).

—Hardcoat Layer—

The thickness of the hardcoat layer is preferably in a range of 0.1 µm to 6 µm and more preferably in a range of 3 µm to 6 µm. When including a hardcoat layer having a thickness in the above-described range, an optical film including a hardcoat layer in which properties such as brittleness or curling suppression are improved, the weight is decreased, and the manufacturing costs are reduced is produced. In addition, when a substrate film is cellulose acylate having a great modulus of elasticity, it is possible to significantly increase the pencil hardness by setting the modulus of elasticity in the above-described specific range or higher.

The hardcoat layer used in the present invention is a layer for imparting hardness or scratch resistance to the film. The hardcoat layer can be formed by, for example, applying a coating composition onto a substrate film (cellulose acylate film) and curing the coating composition.

When the hardcoat layer is provided to the optical film of the present invention, it is possible to improve the Knoop hardness of the surface of the optical film on which the hardcoat layer is not provided or from which the hardcoat layer is completely removed, which is measured from the hardcoat layer side, in a range of 20 N/m$^2$ to 100 N/m$^2$. In addition, in a case in which an anti-glare layer is provided as well, it is possible to increase the Knoop hardness. In a case in which the anti-glare layer is provided to the optical film of the present invention, it is possible to improve the Knoop hardness of the surface of the optical film on which the anti-glare layer is not provided or from which the anti-glare layer is completely removed, which is measured from the anti-glare layer side, in a range of 10 N/m$^2$ to 100 N/m$^2$.

In addition, for the purpose of additionally providing other functions, other functional layers may be laminated on the hardcoat layer. In addition, when a filler or an additive is added to the hardcoat layer, it is also possible to impart mechanical, electrical, and optical physical performance or chemical performance such as water repellency or oil repellency.

The hardcoat layer is preferably formed by curing a curable composition. The curable composition is preferably prepared in a form of a liquid-phase coating composition. An example of the coating composition includes a monomer or an oligomer as a binder for forming a matrix, polymers, and an organic solvent. When this coating composition is applied and then cured, the hardcoat layer can be formed. For curing, a crosslinking reaction or a polymerization reaction can be used.

—Monomer or Oligomer as Binder for Forming Matrix—

Examples of the monomer or the oligomer as a binder for forming a matrix include ionizing radiation polyfunctional monomers and polyfunctional oligomers. The polyfunctional monomers or the polyfunctional oligomers are preferably monomers capable of a crosslinking reaction or a polymerization reaction. The functional group in the ionizing radiation polyfunctional monomers and polyfunctional oligomers is preferably a light, electron beam, or radiation polymerizable functional group and particularly preferably a light polymerizable functional group.

Examples of the light polymerizable functional group include unsaturated polymerizable functional groups such as a (meth)acryloyl group, a vinyl group, a styryl group, and an allyl group and ring-opening polymerization-type polymerizable functional groups such as epoxy-based compounds, and, among these, a (meth)acryloyl group is preferred.

Specific examples of the light polymerizable polyfunctional monomer having a light polymerizable functional group include (meth)acrylic acid diesters of an alkylene glycol such as neopentyl glycol acrylate, 1,6-hexanediol (meth)acrylate, and propylene glycol di(meth)acrylate;

(meth)acrylic acid diesters of a polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic diesters of a polyhydric alcohol such as pentaerythritol di(meth)acrylate;

(meth)acrylic acid diesters of an ethylene oxide or a propylene oxide adduct such as 2,2-bis{4-(acryloxy.diethoxy)phenyl}propane and 2,2-bis{4-(acryloxy.polypropoxy)phenyl}propane; and the like.

Furthermore, urethane(meth)acrylates, polyester(meth)acrylates, isocyanuric acid acrylates, and epoxy(meth)acrylates can also be preferably used as the light polymerizable polyfunctional monomer.

Among these, esters of a polyhydric alcohol and a (meth)acrylic acid are preferred, and polyfunctional monomers having three or more (meth)acryloyl groups in a molecule are more preferred.

Specific examples thereof include (di)pentaerythritol tri(meth)acrylate, (di)pentaerythritol tetra(meth)acrylate, (di)pentaerythritol penta(meth)acrylate, (di)pentaerythritol hexa(meth)acrylate, tripentaerythritol triacrylate, tripentaerythritol hexatriacrylate, trimethylolpropane tri(meth)acrylate, trimethylolethane tri(meth)acrylate, ditrimethylolpropane tetra(meth)acrylate, EO-denatured trimethylolpropane tri(meth)acrylate, PO-denatured trimethylolpropane tri(meth)acrylate, EO-denatured phosphoric acid tri(meth)acrylate, 1,2,4-cyclohexane tetra(meth)acrylate, pentaglycerol triacrylate, 1,2,3-clohexane tetramethacrylate, polyester polyacrylate, caprolactone-denatured tris(acryloxyethyl)isocyanurate, and the like.

In the present specification, "(meth)acrylate", "(meth)acrylic acid", and "(meth)acryloyl" respectively represent "acrylate or methacrylate", "acrylic acid or methacrylic acid", and "acryloyl or methacryloyl".

Furthermore, specific examples thereof also include resins having three or more (meth)acryloyl groups, for example, oligomers or prepolymers of a polyfunctional compound having a relatively low molecular weight such as a polyester resin, a polyether resin, an acrylic resin, an epoxy resin, a urethane resin, an alkyd resin, a spiroacetal resin, a polybutadiene resin, a polythiol polyene resin, or a polyhydric alcohol.

Regarding specific compounds of the polyfunctional acrylate-based compounds having three or more (meth)acryloyl groups, "0096" and the like of JP2007-256844A can be referred to.

Examples of urethane acrylates include urethane acrylate-based compounds obtained by reacting hydroxyl group-containing compounds such as an alcohol, a polyol, and/or a hydroxyl group-containing acrylate and isocyanates or, as necessary, by esterifying a polyurethane compound obtained by means of the above-described reaction using a (meth)acrylic acid.

Regarding specific examples of the specific compound, description in "0017" and the like of JP2007-256844A can be referred to.

When the isocyanuric acid acrylate is used, curling can be further reduced, which is preferable. Examples of the isocyanuric acid acrylates include isocyanuric diacrylates and isocyanuric acid triacrylates, and regarding examples of the specific compounds, "0018" to "0021" of JP2007-256844A can be referred to.

In the hardcoat layer, in order to further reduce shrinkage by means of curing, an epoxy-based compound can be used. As a monomer having an epoxy group for constituting the epoxy-based compound, a monomer having two or more epoxy groups in a molecule is used, and examples thereof include epoxy-based monomers described in JP2004-264563A, JP2004-264564A, JP2005-37737A, JP2005-37738A, JP2005-140862A, JP2005-140863A, JP2002-322430A, and the like. In addition, a compound having both an epoxy-based functional group and an acrylic functional group such as glycidyl(meth)acrylate is preferably used.

—Macromolecular Compound—

The hardcoat layer may include a macromolecular compound. JP2012-215812A describes the macromolecular compound and specific examples thereof, and the content thereof is incorporated into the present specification.

—Curable Composition—

JP2012-215812A describes the curable composition that can be used to form the hardcoat layer and preferred specific examples thereof, and the content thereof is incorporated into the present specification.

—High-Hardness Hardcoat Layer—

As the hardcoat layer that can be provided in the present invention, particularly, in a case in which a high-hardness hardcoat layer is desired, the hardcoat layer described in "0012" to "0057" of JP2012-252275A, "0010" to "0043" of WO2012/043341A1, and the like can be used.

—Properties of Hardcoat Layer—

The hardcoat layer is preferably excellent in terms of scratch resistance. Specifically, in a case in which a pencil hardness test, which serves as an index of scratch resistance, is carried out, the scratch resistance preferably reaches 3H or higher.

(Anti-Glare Layer)

The anti-glare layer can be formed for the purpose of imparting a film with anti-glare characteristics by means of surface scattering and, preferably, hardcoat properties for improving the hardness of the film.

The anti-glare layer that can be used in the present invention is preferably an anti-glare layer which includes a binder and transmissible particles for imparting anti-glare characteristics and has an uneven surface formed due to projections of the transmissible particles or projections formed by a plurality of particle aggregates.

In addition, when the anti-glare layer having hardcoat properties is used, it becomes unnecessary to separately form a hardcoat layer.

Specific examples of the transmissible particles preferably include particles of an inorganic compound such as silica particles and $TiO_2$ particles; and resin particles such as acryl particles, cross-linking acryl particles, polystyrene particles, cross-linking styrene particles, melamine resin particles, and benzoguanamine resin particles. Among these, cross-linking styrene particles, cross-linking acryl particles, and silica particles are preferred.

Regarding the shape of the transmissible particle, transmissible particles having a spherical shape or an irregular shape can be used.

Regarding the refractive index of the binder, from the viewpoint of adjusting inside haze and surface haze, the refractive index of the binder is preferably adjusted in accordance with the refractive indexes of individual transmissible particles selected from the above-described particles. Examples of a binder in accordance with the transmissible particles include combinations of a binder obtained using a tri- or higher-functional (meth)acrylate monomer as a main component (the refractive index after curing is in a range of 1.55 to 1.70) and any one or both of transmissible particles formed of a cross-linking poly(meth)acrylate polymer having a styrene content in a range of 50% by mass to 100% by mass and benzoguanamine particles, and, among these, a combination of the binder and transmissible particles formed of a cross-linking poly(styrene-acrylate) copolymer having a styrene content in a range of 50% by mass to 100% by mass (the refractive index is in a range of 1.54 to 1.59) is preferably exemplified.

In addition, from the above-described viewpoint, the absolute value of the difference between the refractive index of the binder and the refractive index of the transmissible particles is preferably 0.04 or smaller. The absolute value of the difference between the refractive index of the binder and the refractive index of the transmissible particles is preferably 0.030 or smaller, more preferably 0.020 or smaller, and still more preferably 0.015 or smaller.

Here, the refractive index of the binder can be quantitatively evaluated by directly measuring the refractive index using an Abbe refractometer or by measuring the spectral reflection spectrum or the spectral ellipsometry. The refractive index of the transmissible particles is measured by dispersing the same amount of the transmissible particles in a solvent having a refractive index changed by changing the mixing ratio between two kinds of solvents having different refractive indexes, measuring the turbidity of the solvent, and measuring the refractive index of the solvent using an abbe refractometer when the turbidity becomes extremely small.

From the viewpoint of anti-glare characteristics and the like, the content of the transmissible particles is preferably in a range of 3% by mass to 30% by mass and more preferably in a range of 5% by mass to 20% by mass of the total solid contents in the formed anti-glare layer.

In addition, two or more kinds of transmissible particles having different particle diameters may be jointly used. It is possible to impart anti-glare characteristics using transmissible particles having a larger particle diameter and impart other optical characteristics using transmissible particles having a smaller particle diameter.

In addition, in the present invention, in order to control the aggregating properties of the transmissible particles, an aspect in which a smectite-type clay organic complex obtained by intercalating a quaternary ammonium salt in smectite-type clay is used is also preferably exemplified. The content of the smectite-type clay organic complex is preferably in a range of 0.2% by mass to 8.0% by mass, more preferably in a range of 0.3% by mass to 4.0% by mass, still more preferably in a range of 0.4% by mass to 3.0% by mass, and particularly preferably in a range of 0.5% by mass to 2.0% by mass of the total solid contents in the formed anti-glare layer.

As the quaternary ammonium salt, a quaternary ammonium salt represented by General Formula (201) below is preferred.

$$[(R^{201})_3(R^{202})N]^+ \cdot X^- \qquad (201)$$

(In General Formula (201), $R^{201}$ and $R^{202}$ are not identical to each other, $R^{201}$ represents an alkyl group, an alkenyl group, or an alkynyl group which has 4 to 24 carbon atoms, $R^{202}$ represents an alkyl group, an alkenyl group, or an alkynyl group which has 1 to 10 carbon atoms, and $X^-$ represents an anion.)

Examples of the quaternary ammonium salt represented by General Formula (201) include a trioctyl methyl ammonium ion, a tristearyl ethyl ammonium ion, a trioctyl ethyl ammonium ion, a tristearyl methyl ammonium ion, a tridecyl hexyl ammonium ion, a tritetradecyl propyl ammonium ion, and the like, and, among these, a trioctyl methyl ammonium ion and a tristearyl ethyl ammonium ion are preferably exemplified.

In General Formula (201), $X^-$ represents an anion. Examples of the anion include $Cl^-$, $Br^-$, $OH^-$, $NO_3^-$, and the like, and, among these, $Cl^-$ is preferably exemplified.

Examples of a commercially available product of the smectite-type clay organic complex include LUCENTITE SAN, LUCENTITE STN, LUCENTITE SEN, LUCENTITE SPN (all manufactured by Co-op Chemical Co., Ltd.), and the like, and these commercially available products can be singly used or a combination of two or more commercially available products can be used.

The film thickness of the anti-glare layer in the present invention is preferably in a range of 0.5 μm to 50 μm, more preferably in a range of 1 μm to 35 μm, and still more preferably in a range of 1 μm to 25 μm.

The center line average roughness ($Ra_{75}$) of the anti-glare layer in the present invention is preferably in a range of 0.10 μm to 0.40 μm.

In addition, the strength of the anti-glare layer is preferably 3H or higher in a pencil hardness test.

As a method for forming the anti-glare layer, for example, a method in which the anti-glare layer is formed by laminating a matt shape-imparting film having fine projections and recesses on the surface as described in claim 22 of JP1994-16851A (JP-H06-16851A), a method in which the anti-glare layer is formed by means of the curing shrinkage of an ionizing radiation curing-type resin using the difference in the irradiation amount of ionizing radiation as described in claim 10 of JP2000-206317A, a method in which projections and recesses are formed on a coating surface by gelling and solidifying fine transmissible particles and a transmissible resin by decreasing the mass ratio of a favorable solvent with respect to the transmissible resin by means of drying as described in claim 6 of JP2000-338310A, a method in which surface projections and recesses are imparted by imparting external pressure as described in claim 8 of JP2000-275404A, and the like, and these well-known methods can be used.

In addition, examples of the anti-glare layer that can be provided in the present invention include the following anti-glare layers.

The anti-glare layers described in "0010" to "0070" of WO2011/115226A, the anti-glare layers described in "0011" to "0077" of WO2011/115228A, the anti-glare layers described in "0013" to "0057" of WO2011/122483A, the anti-glare layers described in "0023" to "0049" of WO2011/129367A, the anti-glare layers described in "0011" to "0074" of WO2012/046640A, the anti-glare layers described in "0010" to "0073" of WO2012/046662A, the anti-glare layers described in "0011" to "0074" of WO2012/046663A, the anti-glare layers described in "0011" to "0074" of WO2012/046664A, and the anti-glare layers described in "0009" to "0079" of WO2012/053632A.

—Other Layers—

On the surface film of the viewer-side polarizing plate in the liquid crystal display device, in addition to the anti-glare layer or the clear hardcoat layer, an anti-reflection layer (a layer having an adjusted refractive index such as a layer of a high refractive index, a layer of a medium refractive index, or a layer of a low refractive index), an antistatic layer, and an anti-fouling layer are preferably provided.

—Layer of High Refractive Index, Layer of Medium Refractive Index, and Layer of Low Refractive Index—

The refractive index of the layer of a high refractive index is preferably in a range of 1.70 to 1.74 and more preferably in a range of 1.71 to 1.73. The refractive index of the layer of a medium refractive index is adjusted to be a value between the refractive index of the layer of a high refractive index and the refractive index of the layer of a low refractive index. The refractive index of the layer of a medium refractive index is preferably in a range of 1.60 to 1.64 and more preferably in a range of 1.61 to 1.63. The refractive index of the layer of a low refractive index is preferably in a range of 1.30 to 1.47. In the case of a multilayer thin film interference-type anti-reflection film (the layer of a medium refractive index/the layer of a high refractive index/the layer of a low refractive index), the refractive index of the layer of a low refractive index is preferably in a range of 1.33 to 1.38 and more preferably in a range of 1.35 to 1.37.

Regarding a method for forming the layer of a high refractive index, the layer of a medium refractive index, and the layer of a low refractive index, it is also possible to use a transparent thin film of an inorganic substance oxide using a chemical vapor deposition (CVD) method or a physical vapor deposition (PVD) method, and particularly, a vacuum deposition method or a sputtering method which is one of physical vapor deposition methods, but a method by means of all wet coating is preferred.

As the layer of a high refractive index, the layer of a medium refractive index, and the layer of a low refractive index, the layers described in Paragraphs "0197" to "0211" of JP2009-98658A can be used.

These layers are formed on the anti-glare layer, but it is preferable to appropriately adjust a material or the thickness.

(Retardation Film)

Regarding the inner side polarizer protective film that can be used in the viewer-side polarizing plate, it is possible to provide desired characteristics to the inner side polarizer protective film depending on the characteristics of the liquid crystal cell or desired display characteristics, and a retardation film is preferred.

A preferred aspect in a case in which the retardation film of the viewer-side polarizing plate is a single layer is the same as the preferred aspect of the substrate for the surface film of the viewer-side polarizing plate. In addition, a preferred aspect of the substrate in a case in which the retardation film of the viewer-side polarizing plate is a laminate of a substrate and the above-described layer including the absorption material is the same as the preferred aspect of the substrate for the surface film of the viewer-side polarizing plate.

However, the retardation film of the viewer-side polarizing plate preferably further satisfies the following characteristics.

In the retardation film of the viewer-side polarizing plate, from the viewpoint of display characteristics, Re and Rth (defined in the same manner as in the above-described (I') and (II')) measured at a wavelength of 590 nm is preferably |Re|≤100 nm and |Rth|≤400 nm, and more preferably 25 nm≤|Re|≤100 nm and 50 nm≤|Rth|≤250 nm. Re is still more preferably 30 nm≤|Re|≤80 nm and particularly preferably 35 nm≤|Re|≤70 nm. Rth is still more preferably 70 nm≤|Rth|≤240 nm and particularly preferably 90 nm≤|Rth|≤230 nm.

In the present specification, Re, Rth, and Nz at a wavelength of λ nm can be measured as described below.

Reλ is measured by introducing light having a wavelength of λ nm in the film normal direction in a KOBRA 21ADH (manufactured by Oji Scientific Instruments Co., Ltd.).

Rth is computed using a KOBRA 21 ADH on the basis of retardation values measured in a total of three directions, that is, the Re, a retardation value measured by introducing light having a wavelength of λ nm in a direction tilted +40° with respect to the film normal direction using the in-plane slow axis (determined using KOBRA 21ADH) as a tilt axis (rotational axis), and a retardation value measured by introducing light having a wavelength of λ nm in a direction tilted −40° with respect to the film normal direction using the in-plane slow axis as a tilt axis (rotational axis). Here, as the assumed average refractive index, values from a polymer handbook (JOHN WILEY & SONS, INC) and a variety of optical film catalogues can be used. For optical films having unknown average refractive index values, the refractive index values can be measured using an Abbe refractometer. The average refractive index values of the major optical films will be described below: cellulose acylate (1.48), cycloolefin polymer (1.52), polycarbonate (1.59), polymethyl methacrylate (1.49), and polystyrene (1.59).

In the measurement of the retardation film of the viewer-side polarizing plate, in a case in which a thermoplastic resin used for the retardation film of the inner side polarizer protective film viewer-side polarizing plate of the viewer-side polarizing plate is a cellulose ester, the retardation is measured with an assumption that the average refractive index of the retardation film of the viewer-side polarizing plate is 1.48.

The Re and Rth can be adjusted using the kind of a thermoplastic resin used for the retardation film of the viewer-side polarizing plate (in a case in which the thermoplastic resin used for the retardation film of the viewer-side polarizing plate is, for example, a cellulose ester, the degree of substitution of the cellulose ester), the amount of the thermoplastic resin and additives, addition of a retardation developer, the film thickness of the film, the stretching direction and stretching ratio of the film, and the like.

For example, a preferred aspect of the cellulose acylate used for the retardation film of the viewer-side polarizing plate is the same as the preferred aspect of the cellulose acylate having a degree of acyl substitution in a range of 2.0 to 2.6 which is described in JP2012-068661A, and the content thereof is incorporated into the present invention.

A preferred aspect of an additive used in the retardation film of the viewer-side polarizing plate is the same as the preferred aspect of a sugar ester compound, an additive having a negative intrinsic birefringence, a nitrogen-containing aromatic compound-based plasticizer, fine particles, and a retardation developer which is described in JP2012-068661A, and the content thereof is incorporated into the present invention.

A preferred aspect of a method for manufacturing the retardation film of the viewer-side polarizing plate is the same as the preferred aspect of the method for manufacturing a cellulose acylate film described in JP2012-068661A, and the content thereof is incorporated into the present invention.

(Adhesive Layer)

For attachment between the polarizer and the protective film such as a surface film or a retardation film, it is possible to appropriately employ an adhesive or the like depending on the polarizer and the protective film. The adhesive and an adhesion treatment method are not particularly limited, and, for example, the polarizer and the protective film can be attached together using an adhesive made of a vinyl polymer, an adhesive made of at least a water-soluble crosslinking agent of a vinyl alcohol-based polymer such as boric acid, borax, glutaraldehyde, melamine, or oxalic acid. The adhesive layer made of the above-described adhesive can be formed in a form of an applied and dried layer of an aqueous solution or the like, and, in preparation of the aqueous solution, it is possible to formulate a crosslinking agent, other additives, and a catalyst such as an acid as necessary. Particularly, in a case in which a polyvinyl alcohol-based polymer film is used as the polarizer, an adhesive including a polyvinyl alcohol-based resin is preferably used in terms of adhesiveness. Furthermore, an adhesive including a polyvinyl alcohol-based resin having an acetoacetyl group is more preferred in terms of improving durability.

The polyvinyl alcohol-based resin is not particularly limited, but a polyvinyl alcohol-based resin having an average degree of polymerization in a range of approximately 100 to 3,000 and an average degree of saponification in a range of approximately 85% by mol to 100% by mol is preferred in terms of adhesiveness. In addition, the concentration of the adhesive aqueous solution is not particularly limited, but is preferably in a range of 0.1% by mass to 15% by mass and more preferably in a range of 0.5% by mass to 10% by mass. The thickness of the adhesive layer after being dried is preferably in a range of approximately 30 nm to 1,000 nm and more preferably in a range of 50 nm to 300 nm. When the thickness is too thin, the adhesive force becomes insufficient, and, when the thickness is too thick, there is a high possibility that a problem may be caused in terms of appearance.

As another adhesive, a thermosetting resin or an ultraviolet-curable resin such as a (meth)acrylic resin, an urethane-based resin, an acryl urethane-based resin, an epoxy-based resin, or a silicone-based resin can be used.

<Backlight-Side Polarizing Plate>

The backlight-side polarizing plate, similar to a polarizing plate used in an ordinary liquid crystal display device, preferably includes a polarizer and two polarizing plate protective films disposed on both sides of the polarizer. In the present invention, as a protective film disposed on the liquid crystal cell side (inner side) in the two protective films, a retardation film is preferably used.

(Polarizer)

A preferred aspect of a polarizer that can be used in the backlight-side polarizing plate is the same as the preferred aspect of the polarizer that can be used in the viewer-side polarizing plate.

(Retardation Film)

A preferred aspect of the retardation film (inner side polarizer protective film) that can be used in the backlight-side polarizing plate is the same as the preferred aspect of the retardation film (inner side polarizer protective film) that can be used in the viewer-side polarizing plate.

(Polarizer Protective Film)

A preferred aspect of the polarizing plate protective film (outer side polarizing plate protective film) that can be used in the backlight-side polarizing plate is the same as the preferred aspect of the substrate for the surface film (outer side polarizer protective film) that can be used in the viewer-side polarizing plate.

<Backlight Unit>

In the liquid crystal display device of the present invention, the backlight unit emits blue light which has a light emission central wavelength in a wavelength range of 430 nm to 470 nm and has FWHM of a light emission intensity of 50 nm or lower, green light which has a light emission central wavelength in a wavelength range of 510 nm to 560 nm and has FWHM of a light emission intensity of 50 nm or lower, and red light which has a light emission central wavelength in a wavelength range of 610 nm to 660 nm and has FWHM of a light emission intensity of 50 nm or lower.

Regarding the constitution of the backlight unit, an edge light mode in which a light guide plate, a reflection plate, and the like are used as constitutional members or a direct backlight mode may be employed, but the backlight unit preferably includes a reflection member in the rear portion of the light source. The above-described reflection member is not particularly limited, and a well-known reflection member can be used. The reflection member is described in JP3416302B, JP3363565B, JP4091978B, JP3448626B, and the like, and the contents thereof are incorporated into the present invention.

In the liquid crystal display device of the present invention, the half bandwidths of the respective light intensities of the blue light, the green light, and the red light emitted from the backlight unit are all preferably 50 nm or smaller, more preferably 45 nm or smaller, particularly preferably 40 nm or smaller, and more particularly preferably 35 nm or smaller.

An aspect satisfying the above-described aspect is not particularly limited; however, in the present invention, an aspect in which the light source of the backlight unit includes a blue light-emitting diode that emits the blue light and a fluorescent material that emits the green light and the red light when the blue light from the blue light-emitting diode enters or an aspect in which the backlight unit includes a blue light laser that emits the blue light, a green light laser that emits the green light, and a red light laser that emits the red light is preferred.

In addition, in the backlight unit, an ultraviolet light-emitting diode that emits ultraviolet light and a quantum dot that emits the blue light, the green light, and the red light when the ultraviolet light from the ultraviolet light-emitting diode enters may be used.

In the liquid crystal display device of the present invention, preferably, the blue light-emitting diode that emits the blue light and the fluorescent material that emits the green light and the red light when the blue light emitted from the blue light-emitting diode enters are quantum dot members (for example, quantum dot sheets or bar-shaped quantum dot bars), and the quantum dot members are disposed between the backlight-side polarizing plate and a blue light source. The above-described quantum dot member is not particularly limited, and a well-known quantum dot member can be used. The quantum dot member is described in, for example, JP2012-169271A, SID'12 DIGEST p. 895, and the like, and the contents thereof are incorporated into the present invention. In addition, as the above-described quantum dot sheet, a quantum dot enhancement film (QDEF, manufactured by Nanosys Inc.) can be used.

The backlight unit also preferably includes, additionally, a well-known diffusion plate or diffusion sheet, a prism sheet (for example, BEF or the like), and a light guide. The additional members are also described in JP3416302B, JP3363565B, JP4091978B, JP3448626B, and the like, and the contents thereof are incorporated into the present invention.

<Other Constitutions>

(Color Filter)

Regarding pixels in the present invention, in a case in which visible light B having a wavelength of 500 nm or shorter is used as a light source, as a method for forming RGB pixels, a variety of well-known methods can be used. For example, it is possible to form a desired black matrix and R, G, and B pixel patterns on a glass substrate using a photomask and a photoresist or to form a black matrix having a desired width using R, G, and B pixel-coloring inks and eject an ink composition using an inkjet-type printing device into a region partitioned by black matrixes which has a width larger than that of the above-described black matrix provided every n pixels (a concave section surrounded by convex sections) until a desired concentration thereof is reached, thereby producing a color filter made up of R, G, and B patterns. After the image is colored, individual pixels and the black matrixes may be completely cured through baking or the like.

Preferred characteristics of the color filter are described in JP2008-083611A, and the content thereof is incorporated into the present invention.

For example, in a color filter exhibiting green, one of the wavelengths at which the transmittance reaches half the maximum transmittance is preferably in a range of 590 nm to 610 nm, and the other is preferably in a range of 470 nm to 500 nm. In addition, in a color filter exhibiting green, one of the wavelengths at which the transmittance reaches half the maximum transmittance is preferably in a range of 590 nm to 600 nm. Furthermore, in a color filter exhibiting green, the maximum transmittance is preferably 80% or higher. In a color filter exhibiting green, the wavelengths at which the transmittance reaches the maximum is preferably in a range of 530 nm to 560 nm.

In the light source included in the light source unit, the wavelength of a light emission peak in a wavelength range of 600 nm to 700 nm is preferably in a range of 620 nm to 650 nm. The light source included in the light source unit has a light emission peak in a wavelength range of 600 nm to 700 nm, and, in the color filter exhibiting green, the transmittance at the wavelength of the light emission peak is preferably 10% or lower of the maximum transmittance.

In the color filter exhibiting red, the transmittance in a range of 580 nm to 590 nm is preferably 10% or lower of the maximum transmittance.

As pigments for the color filter, C. I. Pigment Blue 15:6 and, as a complementary pigments, C. I. Pigment Violet 23 are used for blue. C. I. Pigment Red 254 and, as a complementary pigments, C. I. Pigment Yellow 139 are used for red. As green pigments, generally, C. I. Pigment Green 36 (copper phthalocyanine bromide green), C. I. Pigment Green 7 (copper phthalocyanine chloride green), as complementary pigments, C. I. Pigment Yellow 150, C. I. Pigment Yellow 138, or the like are used. The half value wavelength can be controlled by adjusting the composition of these pigments. The half value wavelength on the long wavelength side can be set in a range of 590 nm to 600 nm by increasing the amount of the composition of the complementary pigments little by little with respect to a comparative example. Meanwhile, currently, pigments are generally used, but dyes may be used for the color filter as long as the dyes are colorants capable of controlling the spectroscope and of ensuring process stability and reliability.

(Black Matrix)

In the liquid crystal display device of the present invention, a black matrix is preferably disposed between individual pixels. Examples of a material forming the black stripe include a sputtered film of a metal such as chromium, a light-shielding photosensitive composition obtained by combining a photosensitive resin or a black coloring agent, and the like. Specific examples of the black coloring agent include carbon black, titanium carbon, iron oxide, titanium oxide, graphite, and the like, and, among these, carbon black is preferred.

(Thin Film Transistor)

The image display device of the present invention preferably further includes a TFT substrate including a thin film transistor (hereinafter, also referred to as TFT).

The thin film transistor preferably includes an oxide semiconductor layer having a carrier concentration of lower than $1 \times 10^4 / cm^3$. A preferred aspect of the thin film transistor is described in JP2011-141522A, and the content thereof is incorporated into the present invention.

EXAMPLES

Hereinafter, characteristics of the present invention will be more specifically described using examples and comparative examples. Materials, used amounts, proportions, processing contents, processing orders, and the like described in the following examples can be appropriately altered within the purport of the present invention. Therefore, the scope of the present invention should not be limitedly interpreted by specific examples described below.

Examples 1 to 5 and 7 and Comparative Example 1

Production of Surface Film 1 (with No Absorption Material)

(Formation of Hardcoat Layer)

A curable composition hardcoat 1 for hardcoating shown in Table 1 below was prepared as a coating fluid for forming a hardcoat layer.

TABLE 1

| | Monomer | | | Total addition amount [parts by mass] | UV initiator | | Solvent |
| --- | --- | --- | --- | --- | --- | --- | --- |
| | Monomer 1 | Monomer 2 | Monomer 1/ Monomer 2 | | Type | Addition amount [parts by mass] | |
| Hardcoat 1 | Pentaerythritol triacrylate | Pentaerythritol tetraacrylate | 3/2 | 53.5 | UV initiator 1 | 1.5 | Ethyl acetate |

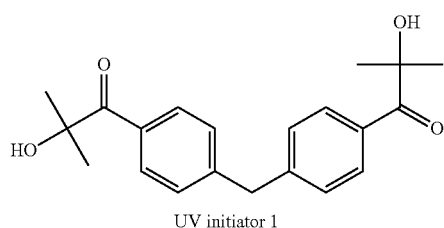 [SMILES: CC(C)(O)C(=O)c1ccc(Cc2ccc(C(=O)C(C)(C)O)cc2)cc1]

UV initiator 1

A 60 μm TAC film TD60UL (manufactured by Fujifilm Corporation) was used as a support, the hardcoat 1 was applied onto one surface of the support, then, was dried at 100° C. for 60 seconds, was irradiated with IV at 1.5 kW and 300 mJ under a condition of 0.1% or less of nitrogen, and was cured, thereby forming a 5 μm-thick hardcoat layer. Meanwhile, the film thickness was adjusted by adjusting the application amount in a die coating method using a slot die.

In the above-described manner, a hardcoat layer was formed on the cellulose acylate produced above.

(Formation of Anti-Glare Layer)

An anti-glare layer No. A2 below was provided on the obtained hardcoat layer of the film.

—Synthesis of Synthetic Smectite—

Water (4 L) was put into a 10 L beaker, No. 3 water glass (SiO 228%, Na 209%, molar ratio: 3.22) (860 g) was dissolved, and 95% sulfuric acid (162 g) was added under stirring at one time, thereby obtaining a silicate solution. Next, a $MgCl_2 \cdot 6H_2O$ primary reagent (purity: 98%) (560 g) was dissolved in water (1 L), and the solution was added to the above-described silicate solution, thereby preparing a homogeneous solution mixture. The homogeneous solution mixture was added dropwise to a 2N—NaOH aqueous solution (3.6 L) under stirring for five minutes.

A reaction precipitate made of the obtained silicon and magnesium complex (a homogeneous complex formed of an aggregate of colloid particles) was immediately filtered and sufficiently washed with water using a cross-flow-mode filtration system manufactured by NGK Insulators, Ltd. [a cross-flow filter (a ceramic film filter, pore diameter: 2 μm, tubular type, filtration area: 400 $cm^2$)] and then is made into a slurry form by adding a solution made of water (200 ml) and $Li(OH) \cdot H_2O$ (14.5 g). The slurry-form reaction precipitate was moved to an autoclave and was hydrothermally reacted at 41 kg/$cm^2$ and 250° C. for three hours. After cooling, the reactant was taken out, dried at 80° C., and crushed, thereby obtaining synthetic smectite which had a composition of hectorite which is a kind of smectite and was represented by the following formula.

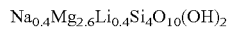

$Na_{0.4}Mg_{2.6}Li_{0.4}Si_4O_{10}(OH)_2$

—Synthesis of Smectite-Type Clay Organic Complex 1—

The synthetic smectite (20 g) obtained above was dispersed in tap water (1,000 ml), a solution (300 ml) obtained by dissolving a substance containing 80% of trioctyl methyl ammonium chloride, which is a quaternary ammonium salt, (2.2 millimole of trioctyl methyl ammonium chloride) (11.1 g) in pure water was added thereto, and the components were reacted under stirring at room temperature (25° C.) for two hours. Next, the product was solid-liquid separated, was washed so as to remove salt byproducts, was dried and crushed, thereby obtaining a clay organic complex.

An X-ray diffraction measurement was carried out on the obtained clay organic complex, and consequently, it was confirmed that the basal spacing computed from the (001) plane reflection thereof was 18.0 angstrom and a smectite-type clay organic complex had been generated. The clay organic complex was dispersed in N,N-dimethylformamide, thereby forming a transparent dispersion liquid. In addition, the content of a quaternary ammonium salt was estimated to be 105 milliequivalents/100 g of smectite from an analysis of the amount of nitrogen atoms by means of combustion of the clay organic complex.

Meanwhile, the added amount of trioctyl methyl ammonium chloride in the above-described synthesis was 110 milliequivalent/100 g of the synthetic smectite, which indicated addition of the same amount of the cation exchange capacity of the synthetic smectite.

—Preparation of Coating Fluid for Anti-Glare Layer—

Individual components were mixed with a solvent mixture of methyl isobutyl ketone (MIBK) and methyl ethyl ketone (MEK) so as to obtain a composition shown in Table 2 below. The mixture was filtered using a polypropylene filter having a pore diameter of 30 μm, thereby preparing a coating fluid for an anti-glare layer. The concentration of solid contents in each coating fluid was 35% by mass. Meanwhile, in the preparation of the coating fluid, the resin particles and the smectite-type clay organic complex were added in a state of a dispersion liquid.

—Preparation of Resin Particle Dispersion Liquid—

A dispersion liquid of transmissible resin particles was prepared by gradually adding the transmissible resin particles to an MIBK solution under stirring so that the concentration of solid contents in the dispersion liquid reached 30% by mass and stirring the components for 30 minutes.

As the resin particles, the following cross-linking styrene-methyl methacrylate copolymer particles prepared by appropriately changing the copolymerization ratio between styrene and methyl methacrylate so that an average particle diameter and a refractive index shown in Table 2 below were obtained were used (manufactured by Sekisui Plastics Co., Ltd.).

B: average particle diameter 2.5 μm, refractive index 1.52

—Preparation of Smectite-Type Clay Organic Complex Dispersion Liquid—

A dispersion liquid of a smectite-type clay organic complex was prepared by gradually adding a smectite-type clay organic complex under stirring to MEK, which was all to be finally used for the coating fluid for an anti-glare layer and stirring the components for 30 minutes.

The respective compounds used will be described below.

PET-30: A mixture of pentaerythritol triacrylate and pentaerythritol tetraacrylate [manufactured by Nippon Kayaku Co., Ltd.]

Irgacure 907: Acetophenone-based light polymerization initiator [manufactured by BASF] (in the following table, indicated as "Irg907")

SP-13: The following fluorine-based surfactant (60:40 (molar ratio))

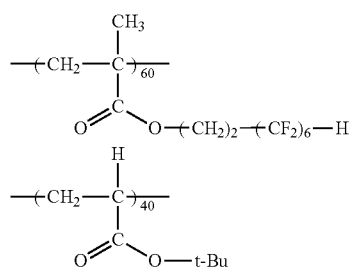

Mw 14000

(Provision of Anti-Glare Layer by Means of Coating)

A film provided with the hardcoat layer obtained above is wound in a roll shape, and an anti-glare layer was formed so as to obtain a film thickness shown in Table 2 below, thereby producing a surface film.

Specifically, each coating fluid was applied using a die coating method in which a slot die was used, which is described in Example 1 of JP2006-122889A, under a condition of a transport speed of 30 m/minute and was dried at 80° C. for 150 seconds. Then, furthermore, ultraviolet rays having an illuminance of 400 mW/cm$^2$ and an irradiance level of 180 mJ/cm$^2$ were radiated using a 160 W/cm air-cooling metal halide lamp (manufactured by Eye Graphics Co., Ltd.) under nitrogen purging and at an oxygen concentration of approximately 0.1% so as to cure a coating layer, thereby forming and then winding an anti-glare layer.

<Production of Surface Film 2 (with Absorption Material)>

A 60 μm TAC film TD60UL (manufactured by Fujifilm Corporation), which was to be used as a support, was saponified using the same method as for the surface film 1.

A layer including an absorption material A was applied to a surface of the saponified TAC film using a method according to the method described in "0043" of JP2008-203436A. Specifically, one surface of the saponified 60 μm TAC film TD60UL was corona-treated, and then a latex (LX407C5, manufactured by ZEON Corporation) made of a styrene-butadiene copolymer having a refractive index of 1.55 and a glass transition temperature of 37° C. was applied to the corona-treated surface, thereby forming an undercoat layer. The latex was applied thereto so that the dried film thickness reached 150 nm. Sodium hydroxide (1 normal) was added to a 10% by mass aqueous solution (180 g) of GELATIN #881 (manufactured by Nitta Gelatin Inc.), thereby adjusting the pH to 7. An absorption material A (dye 3 having the following structure described in the examples of JP2008-203436A, the maximum absorption wavelength after formation of the film: 501 nm, and the half bandwidth of the absorption peak: 20 nm) illustrated below (22 mg/m$^2$) was added thereto and then was stirred at 30° C. for 24 hours. The obtained coating fluid was applied by means of bar coating to the 150 nm-thick undercoat layer side of the support so that the dried film thickness reached 4.5 μm and was dried at 120° C. for 10 minutes, thereby producing a film including a layer including the absorption material formed therein.

Absorption material A: Dye 3 having the following structure described in the examples of JP2008-203436A

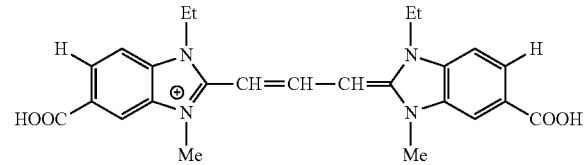 [SMILES: CCN1C(=CC=Cc2n(CC)c3ccc(C(=O)O)cc3[n+]2C)N(C)c2cc(C(=O)O)ccc21]

TABLE 2

| Anti-glare No. | Anti-glare layer coating fluid No. | Smectite-type clay organic complex | Content of quaternary ammonium (/cation exchange capacity) | Amount of complex added | Kind of resin particles | Average particle diameter of resin particles | Refractive index of resin particles |
|---|---|---|---|---|---|---|---|
| A2 | 2 | Complex 1 | x0.864 | 1.20% | B | 2.5 μm | 1.52 |

| Anti-glare No. | Amount of resin particles added (% by mass) | PET30 (% by mass) | Irg907 (% by mass) | SP-13 (% by mass) | Dispensing agent* (% by mass) | Film thickness | MEK (mass ratio) | MEK (mass ratio) |
|---|---|---|---|---|---|---|---|---|
| A2 | 8.00% | 87.62% | 3.00% | 0.15% | 0.03% | 6 μm | 87 | 13 |

*Dispersing agent B: AJISPER PB881 (Ajinomoto Fine-Techno Co., Inc.)

(Saponification of Film)

After the surface film produced using the above-described method was immersed in 4.5 mol/L of a sodium hydroxide aqueous solution (saponification solution) having a temperature adjusted to 37° C. for one minute, the film was washed with water, then, immersed in a 0.05 mol/L sulfuric acid aqueous solution for 30 seconds, and then, furthermore, made to pass through a water-washing bath. In addition, water dripping was repeated three times using an air knife, and after water was dropped, the film was left in a drying zone at 70° C. for 15 seconds so as to be dried, thereby producing a surface film 1.

Furthermore, a hardcoat layer and an anti-glare layer were produced on the layer including the absorption material in the film including the layer including the absorption material formed therein using the same method as in the production of the surface film 1. A surface film 2 including the layer including the absorption material, the hardcoat layer, and the anti-glare layer in this order on the support obtained in the above-described manner was produced.

<Production of Surface Film 3 (with Absorption Material)>

A surface film 3 including a layer including an absorption material, a hardcoat layer, and an anti-glare layer in this order on a support was produced in the same manner as in the production of the surface film 2 except for the fact that, in the production of the surface film 2, an absorption material B (dye 4 having the following structure described in the examples of JP2008-203436A, the maximum absorption wavelength after formation of the film: 594 nm, and the half bandwidth of the absorption peak: 10.5 nm) was used instead of the absorption material A at a coating amount of 17 mg/m².

Absorption Material B

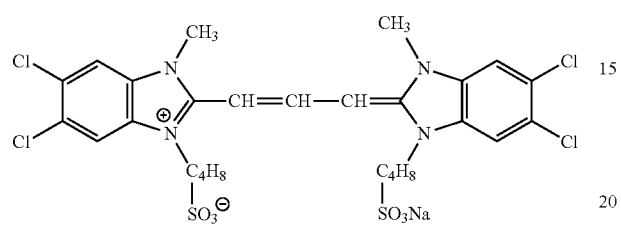

<Production of Surface Film 4 (with Absorption Material)>

A surface film 4 including a layer including an absorption material, a hardcoat layer, and an anti-glare layer in this order on a support was produced in the same manner as in the production of the surface film 2 except for the fact that, in the production of the surface film 2, an absorption material B (dye 4 having the following structure described in the examples of JP2008-203436A) was used instead of the absorption material A at a coating amount of 17 mg/m².

<Production of Retardation Film 1 (with No Absorption Material)>

According to the method described in JP2012-68611A, a dope of a cellulose acylate resin was prepared, and a retardation film 1 was produced by carrying out solution casting using the obtained dope. The details will be described below.

Cellulose acylate having a degree of acetyl substitution of 2.43 was prepared. Sulfuric acid (7.8 parts by mass with respect to 100 parts by mass of cellulose) was added thereto as a catalyst, carboxylic acid was added thereto, and an acylation reaction was carried out at 40° C. After that, the degree of total substitution and the degree of sixth site substitution were adjusted by adjusting the amount of the sulfuric acid catalyst, the amount of moisture, and the aging duration. The aging temperature was 40° C. Furthermore, a low-molecular-weight component in the cellulose acylate was washed with acetone and removed.

The following composition was put into a mixing tank and was stirred so as to dissolve individual components, furthermore, the composition was heated at 90° C. for 10 minutes, and then was filtered using filter paper having an average pore diameter of 34 μm and a sintered metal filter having an average pore diameter of 10 μm.

Cellulose Acylate Solution

| | |
|---|---|
| Cellulose acylate having a degree of acetyl substitution of 2.43 | 100.0 parts by mass |
| Sugar ester 1 having the following skeleton A and a degree of acetyl group substitution of 8 | 10 parts by mass |
| The following additive (1) | 5 parts by mass |
| Methylene chloride | 403.0 parts by mass |
| Methanol | 60.2 parts by mass |

Skeleton A

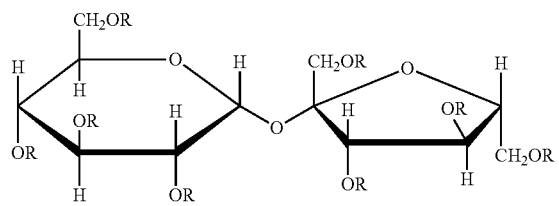

Compound (1): Negative Birefringence Compound

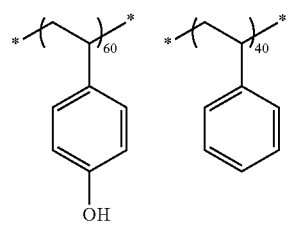

Next, the following composition including a cellulose acylate solution produced using the above-described method was put into a disperser, and a matting agent dispersion liquid was prepared.

Matting Agent Dispersion Liquid

| | |
|---|---|
| Matting agent (AEROSIL972) | 0.2 parts by mass |
| Methylene chloride | 72.4 parts by mass |
| Methanol | 10.8 parts by mass |
| The cellulose acylate solution | 10.3 parts by mass |

The cellulose acylate solution (100 parts by mass) and the matting agent dispersion liquid (at an amount at which the content of inorganic fine particles reached 0.02 parts by mass of the cellulose acylate resin) were mixed together, thereby preparing a dope for forming a retardation film 1.

The dope for forming the retardation film 1 was cast using a band caster. Meanwhile, the band was made of SUS.

After peeled off from the band, a web (film) obtained by means of casting was dried for 20 minutes in a tenter device using the tenter device which transported the web with both ends of the web clipped with clips. Meanwhile, the drying temperature mentioned herein refers to the film surface temperature of the film.

The obtained web (film) was peeled off from the band, was sandwiched using clips, and was stretched in a direction (the horizontal direction) orthogonal to a film transportation direction using a tenter at a stretching temperature of 170° C. and a stretching ratio of 45% under a condition of uniaxial stretching of the fixed end when the residual solvent amount was in a state of 30% to 5% with respect to the mass of the entire film.

After that, the clips were removed from the film, and the film was dried at 110° C. for 30 minutes. At this time, the cast film thickness was adjusted so that the film thickness after the stretching reached 64 μm.

Each film that had undergone the stretching treatment was sequentially subjected to a dew condensation prevention treatment, a heat and humidity treatment (a water vapor contact treatment), and a thermal treatment.

In the dew condensation prevention treatment, dried air was blown to each film, and the film temperature Tf0 was adjusted to 100° C.

In the heat and humidity treatment (the water vapor contact treatment), adjustment was made so that the absolute humidity (heat and humidity treatment absolute humidity) of a wet gas in a wet gas contact chamber reached a value shown in Table 7 and the dew point of the wet gas reached a temperature 10° C. or higher than the temperature Tf0 of each film, and each film was transported while a state in which the temperature (the heat and humidity treatment temperature) of each film reached 100° C. was maintained for a treatment duration (60 seconds).

In the thermal treatment, the absolute humidity (the thermal treatment absolute humidity) of a gas in a thermal treatment chamber was set to 0 g/m$^3$, the temperature (the thermal treatment temperature) of each film was set to the same temperature as the heat and humidity treatment temperature, and the set absolute humidity and the set temperature were maintained for a treatment duration (2 minutes). The film surface temperature was obtained from the average value of temperatures measured at three points in the film using tape-type thermocouple surface temperature sensors (ST series manufactured by Anritsu Meter Co., Ltd.).

(Saponification of Film)

The retardation film produced using the above-described method was saponified using the same method as that for the saponification of the surface film 1.

A film obtained in the above-described manner was used as a retardation film 1.

<Production of Retardation Film 2 (with No Absorption Material)>

A retardation film 2 in which a layer including the absorption materials A and B was applied to the surface of the retardation film 1 was produced using the same method as that for the production of the surface film 2 except for the fact that, in the production of the surface film 2, the retardation film 1 was used instead of a TAC film on which an undercoat layer had been applied, and the absorption material B was used instead of the absorption material A at an application amount of 17 mg/m$^2$.

<Production of Polarizing Film 1 (with No Absorption Material)>

According to Example 1 in JP2001-141926A, a rotation speed difference was imparted between two pairs of nip rollers, and stretching was carried out in the longitudinal direction, thereby preparing a 20 μm-thick polarizing film 1.

<Production of Polarizing Film 2 (with Absorption Material)>

A polarizing film 2 in which a layer including the absorption materials A and B was applied to the surface of the polarizing film 1 was produced using the same method as that for the production of the surface film 2 except for the fact that, in the production of the surface film 2, the polarizing film 1 was used instead of a TAC film on which an undercoat layer had been applied, and the absorption material B was used instead of the absorption material A at an application amount of 17 mg/m$^2$.

<Production of Polarizing Plate>

(Production of Viewer-Side Polarizing Plate)

—Attachment—

One of the respective polarizing films produced using the above-described method, one of the respective surface films, and one of the respective retardation films were selected according to a combination shown in the following table, the polarizing film was sandwiched on the TAC film TD60US side (a side opposite to the surface on which the hardcoat layer and the anti-glare layer were laminated) of the surface film and one cellulose acylate side (a side opposite to the surface on which the layer including the absorption material was laminated in a case in which the layer including the absorption material was laminated) of the retardation film, and then the polarizing film, the surface film, and the retardation film were attached together in a roll-to-roll manner so that the transmission axis and the longitudinal direction of the film were orthogonal to each other using a PVA (PVA-117H manufactured by Kuraray Co., Ltd.) 3% aqueous solution as an adhesive, thereby producing a polarizing plate.

(Production of Backlight-Side Polarizing Plate)

1) Saponification of TAC Film

After a 60 μm TAC film TD60UL (manufactured by Fujifilm Corporation) was immersed in 4.5 mol/L of a sodium hydroxide aqueous solution (saponification solution) having a temperature adjusted to 37° C. for one minute, the film was washed with water, then, immersed in a 0.05 mol/L sulfuric acid aqueous solution for 30 seconds, and then, furthermore, made to pass through a water-washing bath. In addition, water dripping was repeated three times using an air knife, and after water was dropped, the film was left in a drying zone at 70° C. for 15 seconds so as to be dried, thereby producing a saponified 60 μm TAC film TD60UL.

2) Attachment

One of the respective polarizing films produced using the above-described method, one of the respective surface films, and the saponified 60 μm TAC film TD60UL were used, the polarizing film was sandwiched on an arbitrary surface of the saponified 60 μm TAC film TD60UL and the cellulose acylate side of the retardation film, and then the polarizing film, the surface film, and the TAC film were attached together in a roll-to-roll manner so that the transmission axis and the longitudinal direction of the film were orthogonal to each other using a PVA (PVA-117H manufactured by Kuraray Co., Ltd.) 3% aqueous solution as an adhesive, thereby producing a polarizing plate.

<Manufacturing of Liquid Crystal Display Device>

A commercially available liquid crystal display device (manufactured by SONY Corporation, trade name: KDL46W900A) was disassembled, the viewer-side polarizing plate and the backlight-side polarizing plate were changed to the viewer-side polarizing plate and the backlight-side polarizing plate, which had been manufactured above, so as to obtain a combination shown in Table 3 below, thereby manufacturing a liquid crystal display device of each of Examples 1 to 5 and 7, and Comparative Example 1.

The central wavelengths and the half bandwidths of the backlight units in the liquid crystal display devices of Examples 1 to 5 and 7, and Comparative Example 1 were as shown in Table 3 below.

Example 6

Manufacturing of Liquid Crystal Display Device

A commercially available liquid crystal display device (manufactured by SONY Corporation, trade name: KDL46W900A) was disassembled, and the light source (blue LED+Color IQ) for the backlight unit was taken out and was attached to a backlight unit including a blue laser (Nichia Corporation, wavelength: 445 nm, half bandwidth: 1 nm or smaller), a green laser (Sumitomo Electric Industries, Ltd., wavelength: 531 nm, half bandwidth: 1 nm or smaller), and a red laser (Mitsubishi Electric Corporation, wavelength: 638 nm, half bandwidth: 1 nm or smaller) as light sources. The luminance of the backlight was adjusted to be equal to that of a KDL46W900A (trade name, manufactured by SONY Corporation). Furthermore, the viewer-side polarizing plate and the backlight-side polarizing plate were changed to the viewer-side polarizing plate and the backlight-side polarizing plate, which had been manufactured above, so as to obtain a combination shown in Table 3 below, thereby manufacturing a liquid crystal display device of Example 6.

The central wavelengths and the half bandwidths of the respective lasers that were used as backlights in the liquid crystal display device of Example 6 are shown in Table 3 below.

Comparative Example 2

Manufacturing of Liquid Crystal Display Device

A commercially available liquid crystal display device (manufactured by SONY Corporation, trade name: KDL46W900A) was disassembled, and the light source (blue LED+Color IQ) for the backlight unit was taken out and was attached to a three-wavelength LED which was a light source of a backlight unit of KDL-40ZX1 manufactured by SONY Corporation. The luminance of the backlight was adjusted to be equal to that of KDL46W900A (trade name, manufactured by SONY Corporation). Furthermore, the viewer-side polarizing plate and the backlight-side polarizing plate were changed to the viewer-side polarizing plate and the backlight-side polarizing plate, which had been manufactured above, so as to obtain a combination shown in Table 3 below, thereby manufacturing a liquid crystal display device of Comparative Example 2.

The central wavelength and the half bandwidth of the backlight unit in the liquid crystal display device of Comparative Example 2 are shown in Table 3 below.

Comparative Example 3

Manufacturing of Liquid Crystal Display Device

A commercially available liquid crystal display device (manufactured by SONY Corporation, trade name: KDL46W900A) was disassembled, and the light source (blue LED+Color IQ) for the backlight unit was taken out and was attached to a white LED which was a light source of a backlight unit of KDL-52ZX5 manufactured by SONY Corporation. The luminance of the backlight was adjusted to be equal to that of a KDL46W900A (trade name, manufactured by SONY Corporation). Furthermore, the viewer-side polarizing plate and the backlight-side polarizing plate were changed to the viewer-side polarizing plate and the backlight-side polarizing plate, which had been manufactured above, so as to obtain a combination shown in Table 3 below, thereby manufacturing a liquid crystal display device of Comparative Example 3.

The central wavelength and the half bandwidth of the backlight unit are shown in Table 3 below.

[Evaluation]

<Daylight Contrast>

The daylight contrasts of the liquid crystal display devices of the respective examples and the respective comparative examples were measured using the method described in Paragraph "0294" of JP2007-293303A.

The measured results were evaluated according to the following evaluation standards. The results are shown in Table 3 below. Practically, the daylight contrast needs to be level 2 or higher and is preferably level 3 or higher, more preferably level 4 or higher, and particularly preferably level 5.

5: More favorable by 20% or more than the daylight contrast of the liquid crystal display device of Comparative Example 1

4: More favorable by 15% or more and less than 20% than the daylight contrast of the liquid crystal display device of Comparative Example 1

3: More favorable by 10% or more and less than 15% than the daylight contrast of the liquid crystal display device of Comparative Example 1

2: More favorable by 5% or more and less than 10% than the daylight contrast of the liquid crystal display device of Comparative Example 1

1: Equal to or poorer than the daylight contrast of the liquid crystal display device of Comparative Example 1

<White Luminance>

The transmittance in the front surface direction (the normal direction to the display surface) of the liquid crystal display device of each of the examples and the comparative examples when displaying a white screen was measured using a BM-5A (manufactured by TOPCON Corporation) and was considered as white luminance.

The measured results were evaluated according to the following evaluation standards. The results are shown in Table 3 below. Practically, the white luminance needs to be level 3 or higher and is preferably level 4 or higher, and more preferably level 5 or higher.

5: Equal to or higher than the white luminance of the liquid crystal display device of Comparative Example 1

4: Higher by 1% or more and less than 3% than the white luminance of the liquid crystal display device of Comparative Example 1

3: Higher by 3% or more and less than 5% than the white luminance of the liquid crystal display device of Comparative Example 1

2: Higher by 5% or more and less than 8% than the white luminance of the liquid crystal display device of Comparative Example 1

1: Equal to or higher by 8% or more than the white luminance of the liquid crystal display device of Comparative Example 1

<Color Reproduction Region>

The color reproduction region of the liquid crystal display device was measured using the method described in "0066" of JP2012-3073A.

The color reproduction region was evaluated on the basis of the results according to the following standards. Practically, the color reproduction region needs to be level 2 or higher and is preferably level 3 or higher, more preferably level 4 or higher, and particularly preferably level 5.

5: More favorable by 25% or more than the NTSC ratio of the liquid crystal display device of Comparative Example 3

4: More favorable by 20% or more and less than 25% than the NTSC ratio of the liquid crystal display device of Comparative Example 3

3: More favorable by 15% or more and less than 20% than the NTSC ratio of the liquid crystal display device of Comparative Example 3

2: More favorable by 10% or more and less than 15% than the NTSC ratio of the liquid crystal display device of Comparative Example 3

1: Equal to or poorer than the NTSC ratio of the liquid crystal display device of Comparative Example 3

Here, the NTSC ratio refers to a ratio with respect to a triangular area obtained by combining the chromaticity coordinate of red (0.670, 0.330), green (0.210, 0.710), and blue (0.140, 0.080), which is specified by national Television System Committee (NTSC), of a color reproduction region in the XYZ color coordinate system chromaticity diagram of the liquid crystal display device.

absorbance in a wavelength range of 560 nm to 610 nm and had a peak of the absorbance FWHM of which is 50 nm or lower were included in the viewer-side polarizing plate, the daylight contrast was poor.

It was found from Comparative Example 2 that, in the case of three waves in which the half bandwidth of the light emission intensity spectrum of the backlight was greater

TABLE 3

| | Viewer-side polarizing plate | | | | | Backlight-side polarizing plate | | | | |
|---|---|---|---|---|---|---|---|---|---|---|
| | Surface film | | Polarizing film | | Retardation film | | Retardation film | | Polarizing film | |
| | Kind | Absorption material | Kind | Absorption material | Kind | Absorption material | Kind | Absorption material | Kind | Absorption material | Protective film |
| Comparative Example 1 | 1 | — | 1 | — | 1 | — | 1 | — | 1 | — | TAC film |
| Example 1 | 2 | A | 1 | — | 1 | — | 1 | — | 1 | — | TAC film |
| Example 2 | 3 | B | 1 | — | 1 | — | 1 | — | 1 | — | TAC film |
| Example 3 | 4 | A, B | 1 | — | 1 | — | 1 | — | 1 | — | TAC film |
| Example 4 | 1 | — | 2 | A, B | 1 | — | 1 | — | 1 | — | TAC film |
| Example 5 | 1 | — | 1 | — | 2 | A, B | 1 | — | 1 | — | TAC film |
| Example 6 | 4 | A, B | 1 | — | 1 | — | 1 | — | 1 | — | TAC film |
| Comparative Example 2 | 4 | A, B | 1 | — | 1 | — | 1 | — | 1 | — | TAC film |
| Comparative Example 3 | 4 | A, B | 1 | — | 1 | — | 1 | — | 1 | — | TAC film |
| Example 7 | 1 | — | 2 | A, B | 1 | — | 1 | — | 2 | A, B | TAC film |

| | | Backlight | | | Liquid crystal display device performance | | |
|---|---|---|---|---|---|---|---|
| | Kind | Light emission central wavelength | Halt bandwidth | Daylight contrast | White luminance | Color reproducibility |
| Comparative Example 1 | Quantum dot | 447 nm | 22 nm | 1 | 5 | 3 |
| | | 531 nm | 35 nm | | | |
| | | 633 nm | 30 nm | | | |
| Example 1 | Quantum dot | 447 nm | 22 nm | 3 | 4 | 4 |
| | | 531 nm | 35 nm | | | |
| | | 633 nm | 30 nm | | | |
| Example 2 | Quantum dot | 447 nm | 22 nm | 3 | 4 | 4 |
| | | 531 nm | 35 nm | | | |
| | | 633 nm | 30 nm | | | |
| Example 3 | Quantum dot | 447 nm | 22 nm | 5 | 4 | 4 |
| | | 531 nm | 35 nm | | | |
| | | 633 nm | 30 nm | | | |
| Example 4 | Quantum dot | 447 nm | 22 nm | 4 | 4 | 4 |
| | | 531 nm | 35 nm | | | |
| | | 633 nm | 30 nm | | | |
| Example 5 | Quantum dot | 447 nm | 22 nm | 3 | 4 | 4 |
| | | 531 nm | 35 nm | | | |
| | | 633 nm | 30 nm | | | |
| Example 6 | Laser | 445 nm | 1 nm or smaller | 5 | 5 | 5 |
| | | 531 nm | 1 nm or smaller | | | |
| | | 638 nm | 1 nm or smaller | | | |
| Comparative Example 2 | Three-wavelength LED | 451 nm | 26 nm | 5 | 2 | 2 |
| | | 531 nm | 100 nm | | | |
| | | 656 nm | 110 nm | | | |
| Comparative Example 3 | White LED | 450 nm | 25 nm | 5 | 1 | 1 |
| | | 550 nm | 180 nm | | | |
| Example 7 | Quantum dot | 447 nm | 22 nm | 4 | 4 | 5 |
| | | 531 nm | 35 nm | | | |
| | | 633 nm | 30 nm | | | |

From Table 3, it was found that the liquid crystal display device of the present invention has favorable daylight contrast, white luminance, and color reproducibility.

On the other hand, it was found from Comparative Example 1 that, in a case in which neither the first absorption material which had a maximum value of absorbance in a wavelength range of 470 nm to 510 nm and had a peak of the absorbance FWHM of which is 50 nm or lower nor the second absorption material which had a maximum value of than 50 nm, when a polarizing plate including the absorption material was used, the white luminance was poor.

It was found from Comparative Examples 2 and 3 that, in a case in which a backlight unit including a three-wavelength LED in which the half bandwidth of the light emission intensity spectrum of the backlight was greater than 50 nm or a white LED only having one peak with a wide half bandwidth in the bands of green light and red light was used, the white luminance was poor.

EXPLANATION OF REFERENCES

1: viewer-side polarizing plate
F1: surface film
2: anti-glare layer
3: hardcoat layer
4: layer including absorption material
5: substrate for surface film
6: polarizer
7: substrate for polarizer
F2: retardation film (inner side polarizing plate protective film of viewer-side polarizing plate)
8: substrate for retardation film
11: liquid crystal cell
21: backlight-side polarizing plate
F3: retardation film (inner side polarizing plate protective film of backlight-side polarizing plate)
22: polarizer
F4: polarizing plate protective film (outer side polarizing plate protective film of backlight-side polarizing plate)
31: backlight unit
41: liquid crystal display device

What is claimed is:

1. A liquid crystal display device comprising:
a viewer-side polarizing plate;
a liquid crystal cell;
a backlight-side polarizing plate; and
a backlight unit,
wherein the backlight unit emits blue light which has a light emission central wavelength in a wavelength range of 430 nm to 470 nm and has a full width at half maximum of a light emission intensity of 50 nm or lower, green light which has a light emission central wavelength in a wavelength range of 510 nm to 560 nm and has full width at half maximum of a light emission intensity of 50 nm or lower, and red light which has a light emission central wavelength in a wavelength range of 610 nm to 660 nm and has a full width at half maximum of a light emission intensity of 50 nm or lower, and
the viewer-side polarizing plate includes at least one of
a first absorption material which has a maximum value of absorbance in a wavelength range of 470 nm to 510 nm and has a peak of the absorbance a full width at half maximum of which is 50 nm or lower, and
a second absorption material which has a maximum value of absorbance in a wavelength range of 560 nm to 610 nm and has a peak of the absorbance a full width at half maximum of which is 50 nm or lower.

2. The liquid crystal display device according to claim 1, wherein the viewer-side polarizing plate preferably includes both the first absorption material and the second absorption material.

3. The liquid crystal display device according to claim 1, wherein the viewer-side polarizing plate includes at least a polarizer and a surface film disposed on a surface of the polarizer on a side opposite to the liquid crystal cell, and
at least one of the surface film and the polarizer includes at least one of the first absorption material and the second absorption material.

4. The liquid crystal display device according to claim 3, further comprising:
at least one of the first absorption material and the second absorption material on the surface film.

5. The liquid crystal display device according to claim 1, wherein the backlight unit includes a blue light-emitting diode that emits the blue light and
a quantum dot member that emits the green light and the red light when the blue light from the blue light-emitting diode enters.

6. The liquid crystal display device according to claim 1, wherein the backlight unit includes a blue light laser that emits the blue light, a green light laser that emits the green light, and a red light laser that emits the red light.

* * * * *